United States Patent [19]
Smith et al.

[11] Patent Number: 5,848,250
[45] Date of Patent: Dec. 8, 1998

[54] PROCESSOR UPGRADE SYSTEM FOR A PERSONAL COMPUTER

[75] Inventors: Jimmy D. Smith, Stevensville; Richard A. Hamersley, St. Joseph; Anthony M. Olson, Stevensville, all of Mich.

[73] Assignee: Packard Bell NEC, Sacramento, Calif.

[21] Appl. No.: 468,181

[22] Filed: Jun. 6, 1995

Related U.S. Application Data

[63] Continuation of Ser. No. 41,787, Apr. 1, 1993, abandoned.

[51] Int. Cl.[6] .................................................... G06F 13/00
[52] U.S. Cl. ........................................ 395/309; 395/551
[58] Field of Search ................................. 395/325, 500, 395/200, 306, 551

[56] References Cited

U.S. PATENT DOCUMENTS

| | | | |
|---|---|---|---|
| 4,974,191 | 11/1990 | Amirghodsi et al. | 364/900 |
| 5,109,517 | 4/1992 | Houda et al. | 395/800 |
| 5,144,551 | 9/1992 | Gepulis | 395/425 |
| 5,163,145 | 11/1992 | Parks . | |
| 5,287,531 | 2/1994 | Rogers, Jr. et al. | 345/800 |
| 5,297,272 | 3/1994 | Lu et al. | 395/500 |
| 5,313,619 | 5/1994 | Bumbarger | 395/550 |
| 5,325,490 | 6/1994 | Brasseur | 395/325 |
| 5,408,611 | 4/1995 | Kim | 395/275 |
| 5,426,767 | 6/1995 | Crosswy | 395/500 |

FOREIGN PATENT DOCUMENTS

| | | |
|---|---|---|
| 0 510 241 A2 | 4/1991 | European Pat. Off. . |
| 0529142 | 3/1993 | European Pat. Off. ........ G06F 13/40 |

OTHER PUBLICATIONS

"Upwardly Mobile PCs", Gina Smith, *PC/Computing,* Jan. 1992, pp. 124–132.
"Small, Light, snd Capable Upgradable PCs", Jim Seymour, *PC Magazine,* Dec. 8, 1992.
"Acer's Chipup" patent claims shock Taiwan board makers, Charlene Huang, *Electronics,* 8 Feb. 1993, p. 8.
"Field Guide to CPUs", Gina Smith, *PC/Computing,* Mar. 1993, pp. 123–130.

*Primary Examiner*—Jack B. Harvey
*Assistant Examiner*—David A. Wiley
*Attorney, Agent, or Firm*—Fitch, Even, Tabin & Flannery

[57] ABSTRACT

A system for upgrading a personal computer includes a motherboard having upgrade sockets for upgrading the CPU and the clock oscillator without the need to remove any components. The system includes sensing circuitry for detecting the type of component plugged into the upgrade socket and circuitry for disabling the upgraded component. In addition, the system includes software for reconfiguring various signals depending on the particular upgrade plugged into the upgrade socket. By providing a system that can be upgraded by merely inserting a newer components, upgrades can be performed rather quickly. In addition, the upgrade system allows the end user a plurality of upgrade options while at the same time allows the end user to take advantage of declining CPU prices.

30 Claims, 13 Drawing Sheets

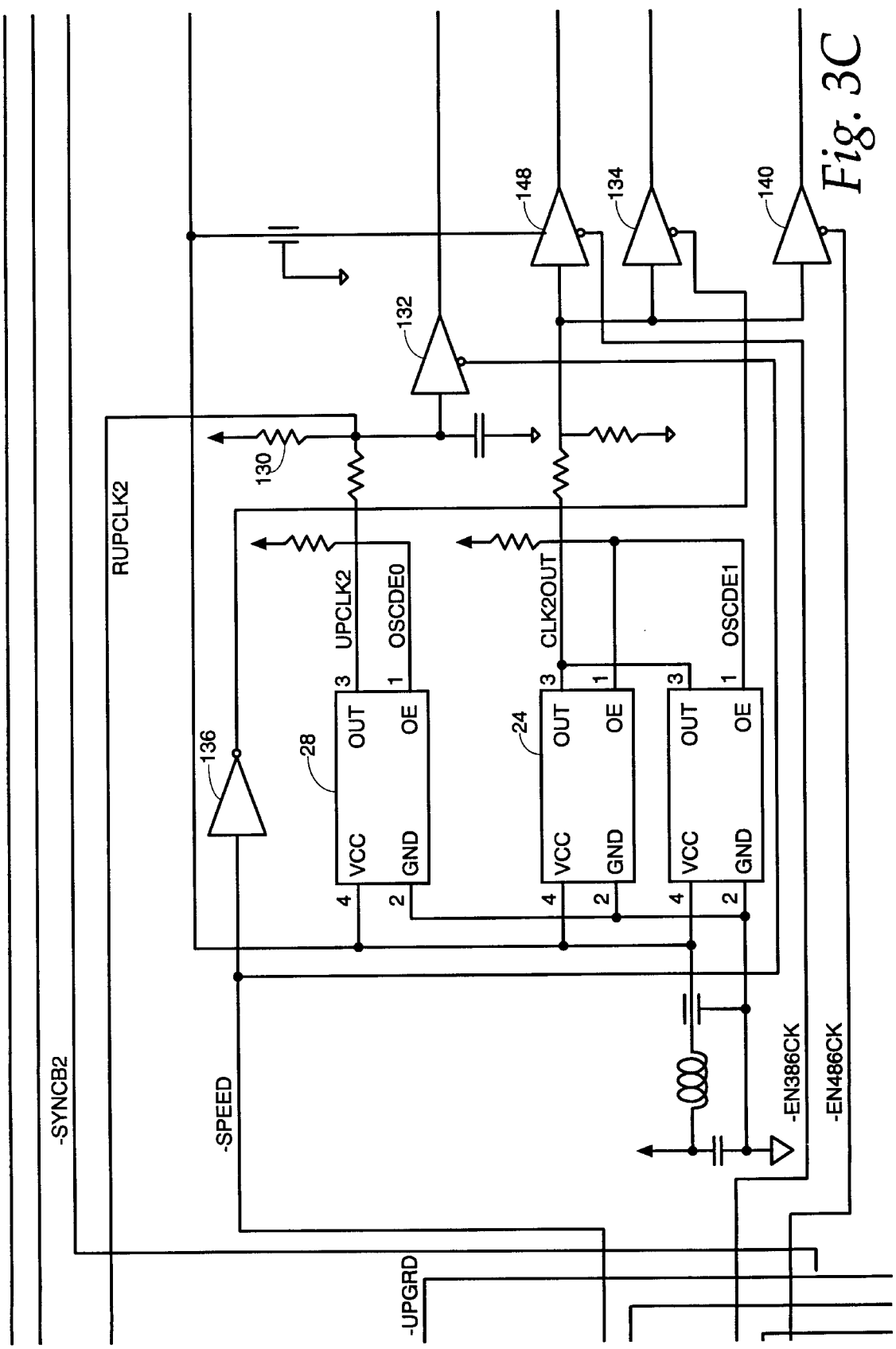

Fig. 5A

| 22 | | |
|---|---|---|
| CLK14SX 123 | CLK | A2 146 |
| 135 | BS8 | A3 150 |
| 136 | BS16 | A4 152 |
| 133 | RDY | A5 154 |
| 138 | BRDY | A6 158 |
| 130 | HOLD | A7 159 |
| 129 | AHOLD | A8 161 |
| 101 | INTR | A9 163 |
| | | A10 166 |
| 103 | RESET | A11 172 |
| 100 | NMI | A12 174 |
| 105 | EADS | A13 176 |
| 132 | KEN | A14 178 |
| 102 | FLUSH | A15 180 |
| 137 | BOFF | A16 181 |
| 104 | A20M | A17 183 |
| 16 | DP0 | A18 189 |
| 30 | DP1 | A19 191 |
| 43 | DP2 | A20 193 |
| 57 | DP3 | A21 2 |
| 17 | D0 | A22 3 |
| 18 | D1 | A23 4 |
| 20 | D2 | A24 5 |
| 23 | D3 | A25 7 |
| 25 | D4 | A26 8 |
| 26 | D5 | A27 9 |
| 27 | D6 | A28 10 |
| 29 | D7 | A29 12 |
| 31 | D8 | A30 13 |
| 32 | D9 | A31 14 |
| 35 | D10 | BE0 117 |
| 37 | D11 | BE1 116 |

| 26 | | |
|---|---|---|
| CLK1 C3 | CLK | A2 Q14 |
| B16 | BS8 | A3 R15 |
| C17 | BS16 | A4 S16 |
| F16 | RDY | A5 Q12 |
| H15 | BRDY | A6 S15 |
| E15 | HOLD | A7 Q13 |
| A17 | AHOLD | A8 R13 |
| A16 | INTR | A9 Q11 |
| NMI B15 | NMI | A10 S13 |
| C16 | RESET | A11 R12 |
| -IGNNE A15 | IGNNE | A12 S7 |
| B17 | EADS | A13 Q10 |
| F15 | KEN | A14 S5 |
| C15 | FLUSH | A15 R7 |
| D17 | BOFF | A16 Q9 |
| D15 | A20M | A17 Q3 |
| N3 | DP0 | A18 R5 |
| F1 | DP1 | A19 Q4 |
| H3 | DP2 | A20 Q8 |
| A5 | DP3 | A21 Q5 |
| P1 | D0 | A22 Q7 |
| N2 | D1 | A23 S3 |
| N1 | D2 | A24 Q6 |
| H2 | D3 | A25 R2 |
| M3 | D4 | A26 S2 |
| J2 | D5 | A27 S1 |
| L2 | D6 | A28 R1 |
| L3 | D7 | A29 P2 |
| F2 | D8 | A30 P3 |
| D1 | D9 | A31 Q1 |
| E3 | D10 | BE0 K15 |
| C1 | D11 | BE1 J16 |

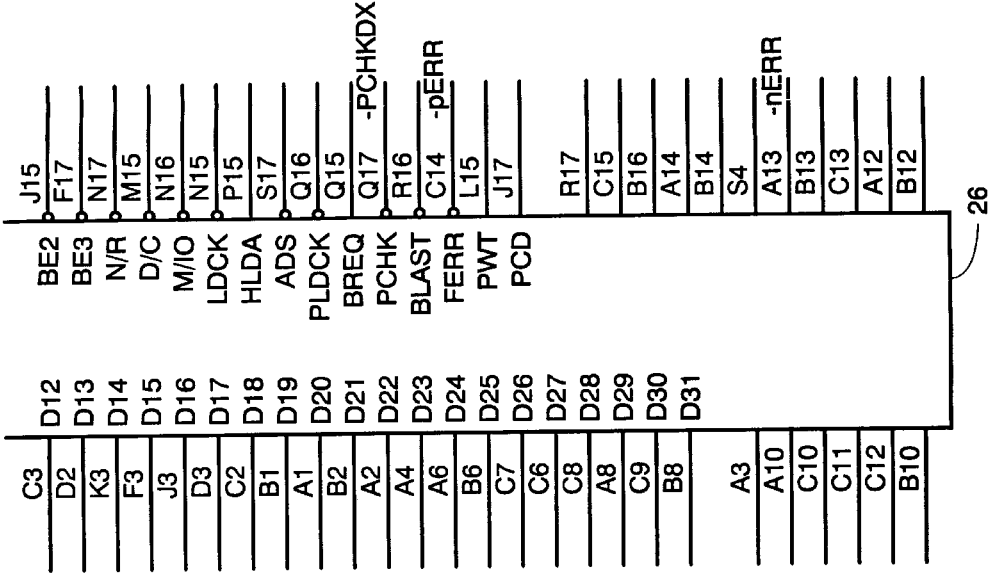
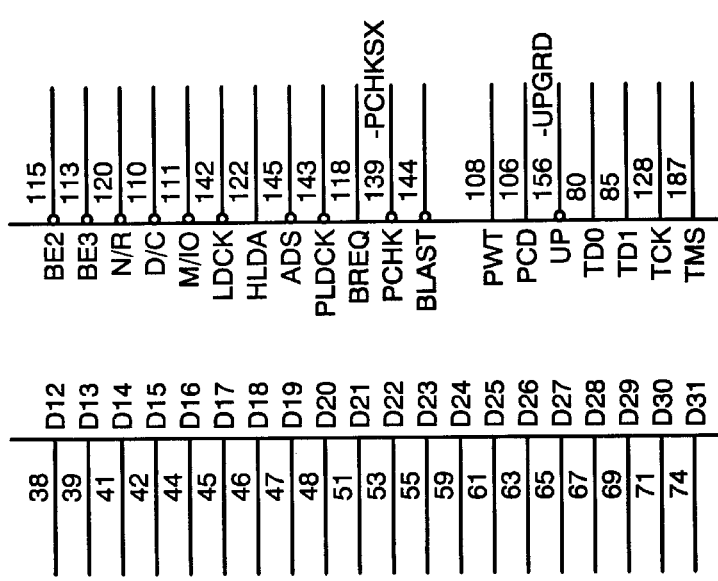
Fig. 5B
Fig. 5C
Fig. 5A | Fig. 5B

PROCESSOR UPGRADE SYSTEM FOR A PERSONAL COMPUTER

This application is a continuation of application Ser. No. 08/041,787 filed Apr. 1, 1993, now abandoned.

BACKGROUND OF THE INVENTION

1. Technical Field

The present invention relates to a system for upgrading a computer system, such as a personal computer and, more particularly, to a system which includes a motherboard having a predetermined wired-in central processing unit (CPU) and predetermined wired-in clock oscillator and upgrade sockets which allow the CPU and the clock oscillator to be upgraded by simply inserting the new components into the upgrade sockets, and further includes control logic for disabling the on board components to obviate the need to remove any components and for determining the type of upgrade components installed in the upgrade sockets to re-route any signals to the upgrade socket, if necessary, depending on the particular type of component installed.

2. Description of the Prior Art

Various systems are known in the art for upgrading personal computers. For example, in some known systems, the motherboard in the personal computer is provided with an expansion connector for receiving an upgrade printed circuit board, known as a daughterboard, containing upgrade components, such as a relatively newer CPU and a faster oscillator, as well as various other components, such as a random access memory (RAM). In those applications, the daughterboard is installed by opening the computer case and inserting the daughterboard into the expansion connector on the motherboard. In addition, some known systems require reconfiguration of certain switches on the motherboard or the installation or removal of jumpers. As such, such CPU upgrade systems require a certain amount of knowledge on the part of the person performing the upgrade as well as various tools in order to do the upgrade. Accordingly, such upgrades have been known to be beyond the ability of various non-technical end users.

In addition, there are various other problems with known upgrade systems. For example, in addition to reconfiguring various jumpers and switch settings on the motherboard, a CPU upgrade may also require an update of the basic input/output system (BIOS). For personal computers with the BIOS stored in a read-only memory (ROM), such a CPU upgrade would require replacement of the BIOS ROM chip, thus adding to the cost and complexity of the CPU upgrade. Due to the technical complexity in such applications, such upgrades have to be done by computer technicians, thus significantly raising the cost of the upgrade, perhaps to the point of making the upgrade more expensive than the purchase of a new computer system.

Another problem with some known upgrade systems is the relative cost of the upgrade; especially considering the fact that an entire printed circuit board must be purchased. Moreover, such upgrade boards are normally custom designed by the computer manufacturer in order to prevent incompatibility problems. As such, the owner of an upgradable personal computer becomes a captive customer for the upgrade board, thus giving the manufacturer little incentive to lower the prices on such an upgrade board, even though the cost of the new CPUs may have declined substantially.

Another problem with known upgrade boards is that some systems are known to provide only a single upgrade option. As such, a user is placed in a position of spending a significant amount for an upgradable system for the ability to upgrade to the next highest performance CPU. In those applications, upgrading beyond the next highest performance CPU would require the purchase of a new personal computer or a new motherboard with an upgradable feature. For large-scale users, for example institutional users, such a purchase amounts to a significant capital expenditure which would have to be made every several years as newer and faster CPUs are developed.

SUMMARY

It is an object of the present invention to solve various problems in the prior art.

It is another object of the present invention to provide a system for quickly and easily upgrading a CPU in a computer system.

It is yet another object of the present invention to provide a system for enabling an end user to replace a CPU in a computer system.

It is yet a further object of the present invention to provide a system for upgrading a CPU in a computer system that is relatively inexpensive.

It is yet another object of the present invention to provide a system which allows the end user a plurality of options for upgrading a CPU.

BRIEF DESCRIPTION OF THE DRAWING

These and other objects of the present invention will be readily understood with reference to the following specification and accompanying drawing, wherein:

FIGS. 3A–3F are schematic diagrams of the processor upgrade system in accordance with the present invention;

FIGS. 5A and 5B are pin diagrams of the wired-in CPU and CPU expansion bracket in accordance with the present invention.

FIG. 5C is an orientation diagram illustrating the orientation of FIGS. 5A and 5B.

DETAILED DESCRIPTION OF THE PREFERRED EMBODIMENT

The present invention relates to a microprocessor and oscillator clock upgrade system for computer systems, such as personal computers, which enables an end user to upgrade a CPU or a clock oscillator by simply inserting the upgrade component into an expansion socket on the motherboard. In particular, the system includes a motherboard with a predetermined wired-in CPU and clock oscillator and expansion sockets for CPU and the clock oscillator. The CPU expansion socket is adapted to receive a plurality of different CPU's. Circuitry is included for sensing if any components have been inserted into the expansion sockets and, if so, the type of component. Once the system determines the type of component inserted into the expansion socket on the motherboard, the existing components (e.g., wired-in CPU and/or clock oscillator) are disabled and certain signals are re-routed if necessary to the correct pins on the expansion sockets to be correct for the particular component inserted in the expansion socket.

Thus, in order to upgrade a CPU or clock oscillator on the motherboard, only the upgrade component need be purchased and installed, which greatly simplifies the task for the end user while at the same time allowing the end user to take advantage of declining CPU prices.

An important aspect of the invention is the ability of the system to provide multiple options with respect to the choice of CPU upgrades. As described and illustrated herein, the system assumes that either an Intel-type 80486SX or 80386SX microprocessor is soldered into the motherboard. However, the principles of the present invention are applicable to other types of microprocessors being soldered down to the motherboard, such as an Intel-type 80836DX.

Various options are available for the CPU upgrade socket. For example, as described and illustrated herein, the CPU expansion socket can be populated with various microprocessors, such as: an Intel-type 80486SX; a type 80486DX or a 80487SX. However, it should be clear to those of ordinary skill in the art that although the invention is described and illustrated with respect to specific Intel microprocessors, the principles of the present invention are not so limited.

As used herein a minus sign (−) preceding a signal name is used to represent an active low signal. For example, the designation "−PCHKSX" is used to represent an active low signal. Conversely, the lack of a minus sign preceding a signal designation represents an active high signal. For example, the signal "VCCGD" represents an active high signal.

In addition, reference is made to several Intel-type microprocessors, such as types 80386SX, 80486SX, 80486DX and 80487SX. For simplicity, such microprocessors are hereinafter referred to by their more popular designations—without the "80" prefix; for example, "486SX". In addition, the designation "486XX" is used to represent any of the type 486/487 microprocessors, such as a type 486SX, 486DX and 487SX.

Figure 1:
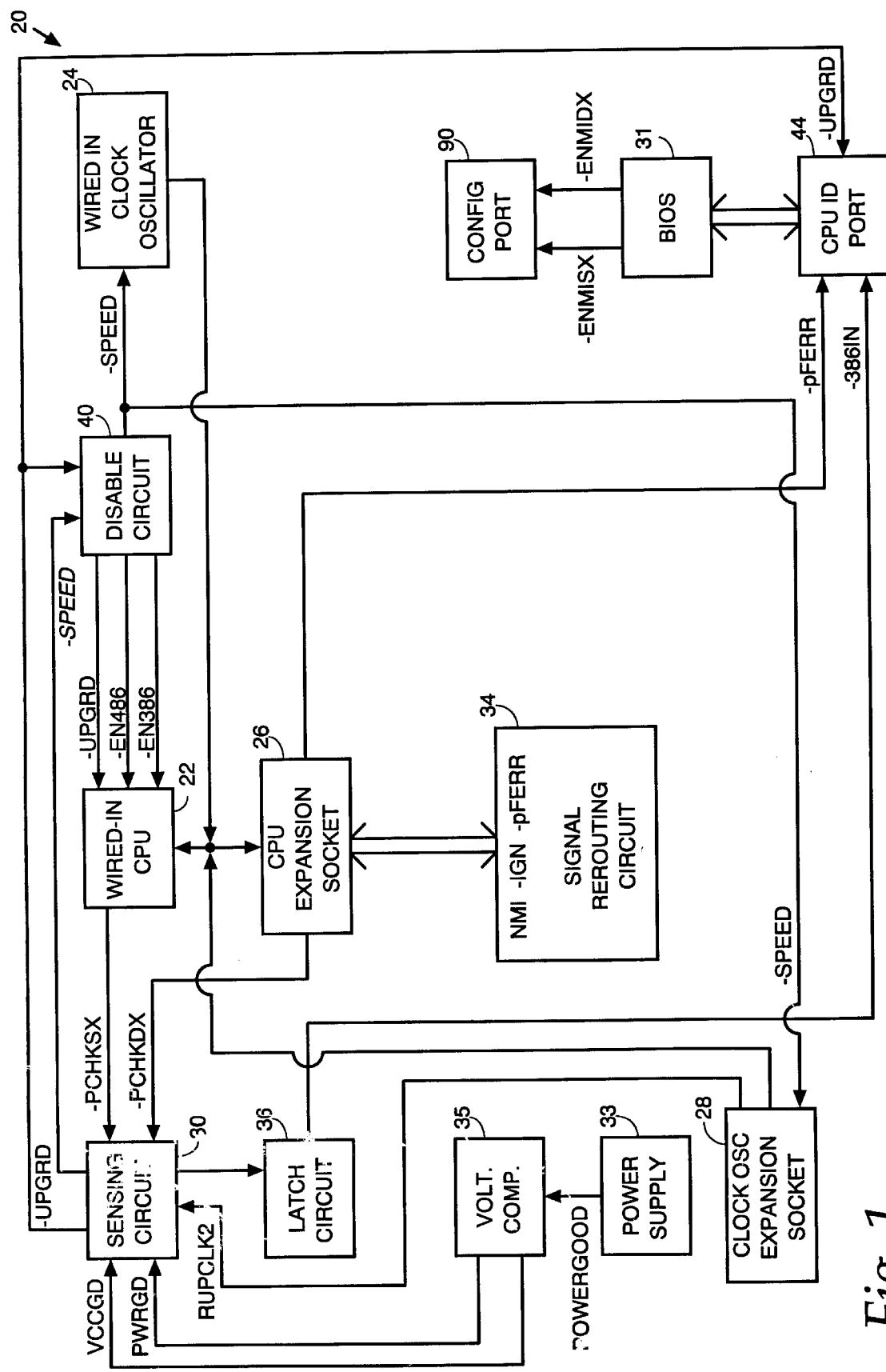
FIG. 1 is a block diagram of the processor upgrade system in accordance with the present invention.

FIG. 1 illustrates a simplified block diagram of the system in accordance with the present invention. The system includes a motherboard 20 with a wired-in CPU 22 and a wired-in clock oscillator 24. In order to enable the CPU 22 and clock oscillator 24 to be upgraded, a CPU expansion socket 26 and an oscillator expansion socket 28 are provided and connected to the motherboard 20 in the same fashion as the wired-in CPU 22 and wired-in oscillator 24, except as noted below. The system also includes a sensing circuit 30 and a signal re-routing circuit 34.

SENSING CIRCUIT

The sensing circuit 30 is used to determine if any upgrade components have been inserted in the CPU expansion socket 26 and the clock oscillator expansion socket 28. In addition, the sensing circuit 30 in combination with new functions incorporated into the basic input/output system (BIOS) (represented as a function block 31 for clarity) is able to determine the particular type of microprocessor installed in the CPU expansion socket 26. The sensing circuit 30 is able to make these determinations in part by monitoring parity check signals −PCHKSX and −PCHKDX. These signals −PCHKSX and −PCHKDX are driven from the soldered-in CPU 22 and any CPU populated in the CPU expansion socket 26, respectively. These signals, −PCHKSX and −PCHKDX are derived from a −PCHK signal, available on type 486XX microprocessors. For clarity, the parity check signal −PCHK available from the wired-in CPU 22 is identified as −PCHKSX, while the parity check signal −PCHK signal from the CPU expansion socket 26 is identified as −PCHKDX.

The parity check signals −PCHKSX and −PCHKDX are driven high (or inactive) at power up by type 486XX microprocessors. These signals, −PCHKSX and −PCHKDX, will remain high until the first clock cycle that indicates incorrect parity. Since the parity checking feature is not used in this system, the parity check signals −PCHKSX and −PCHKDX will begin changing states as cycles occur. As such, it is necessary that these signals −PCHKSX and −PCHKDX be latched. However, in order to avoid spurious operation of the system, these signals −PCHKSX and −PCHKDX are not latched until the power supply 33 becomes stable. As will be discussed in more detail below, once the power supply 33 is stable, a signal VCCGD, available from a voltage comparator circuit 35, goes active. The VCCGD signal is combined with the parity check signals −PCHKSX and −PCHKDX to drive a latch circuit 36, which drives a latch signal identified as −386IN.

The −386IN signal is used to indicate whether a type 486XX microprocessor or a type 386SX microprocessor is installed and in control on the motherboard 20. In particular, the −386IN signal is an active low signal. When the −386IN signal is low, it represents that a type 386SX microprocessor is installed on the motherboard 20 and in control. When the −386IN signal is high, it indicates that a type 486XX microprocessor is in control. More particularly, if the CPU expansion socket 26 is not populated with a type 486XX microprocessor, the parity check signal −PCHKDX will be low at power up, since there is no type 486XX microprocessor to drive it and a pull-down resistor is installed. The parity check signal −PCHKSX, available from the wired-in CPU 22, is also checked at power up. Since it is assumed that the wired-in CPU 22 is a type 486SX or 386SX microprocessor, the parity check signal −PCHKSX will be high at power up unless the wired-in CPU. 22 is a type 386SX. In particular, if the parity check signal −PCHKSX is low at power up, this indicates that the wired-in CPU 22 is not a type 486XX microprocessor and that a type 386SX microprocessor is wired into the motherboard 20. If the parity check signal −PCHKDX, available at the CPU expansion socket 26, is also low, the sensing circuit 30 will latch signal −386IN low indicating that a type 386SX microprocessor is in control on the motherboard 20.

On the other hand, if either of the parity check signals −PCHKSX or −PCHKDX goes high at power up, indicating that a type 486XX microprocessor is present on the motherboard and in control, the signal −386IN is latched high. The parity check signal −PCHKDX is used to drive an active low upgrade signal −UPGRD. Thus, if a type 486XX microprocessor is installed in the CPU expansion socket 26, the parity check signal −PCHKDX will be driven high at power up. Once the power supply 33 has stabilized, the parity check signal −PCHKDX is used to drive the latch signal −386IN inactive (e.g., high) and the upgrade signal −UPGRD active (e.g., low). The upgrade signal −UPGRD is used to drive a disable circuit 40 which, in turn, disables the wired-in CPU 22.

The sensing circuit 30 also monitors the clock oscillator expansion socket 28. Once the sensing circuit 30 determines that the clock oscillator upgrade socket 28 is populated, the wired-in oscillator 24 is disabled to allow the clock oscillator installed in the oscillator upgrade socket 28 to take over as the system main clock. In particular, once the oscillator upgrade socket 28 is populated, it clocks an RUPCLK2 clock signal, used by the sensing circuit 30 to drive and latch a –SPEED signal active. The –SPEED signal, in turn, is used by the disable circuitry 40 to disable the wired-in oscillator 24 from the upgrade socket and other components on the motherboard.

SIGNAL RE-ROUTING CIRCUIT

Once the sensing circuit 30 determines the presence or absence of an upgrade microprocessor in the CPU expansion socket 26 and/or an upgrade oscillator in the expansion oscillator socket 28, the signal re-routing circuit 34 re-routes certain signals depending on the particular microprocessor populated in the upgrade CPU socket 26. These signals relate to basic differences in the signal configuration between an Intel-type 486SX, type 486DX and type 487SX microprocessors. In particular, there are three signals that require re-routing depending on the particular type of microprocessor in the CPU expansion socket 26, as illustrated in Table I.

TABLE I

Signal Re-Routing

| Signal Name | Definition |
| --- | --- |
| NMI | Non-maskable interrupt input to upgrade socket. |
| –IGN | Ignore numeric co-processor input to upgrade socket. |
| –pFERR | Output co-processor error signal. |

For a type 486SX microprocessor, the non-maskable interrupt signal NMI must be routed to pin A15 of the expansion socket 26 in order to be correct. For type 486DX and type 487SX microprocessors, the NMI signal must be routed to pin B15.

The other two signals identified in Table I, –IGN and –PFERR, are co-processor signals, only available on type 486DX and type 487SX microprocessors. These signals –IGN and –PFERR are not available on type 486SX microprocessors. Thus, for type 486SX microprocessors, the co-processor error signals –IGN and –PFERR are not connected. For type 486DX and type 487SX microprocessors, the co-processor ignore error signal –IGN is connected to pin A15 of the CPU expansion socket 26 to be correct.

The other co-processor error signal –PFERR is also manipulated depending on the type of microprocessor installed in the CPU expansion socket 26. In particular, as mentioned above, this co-processor error signal is only available on type 486DX and type 487SX microprocessors. However, there is a difference in the pin locations for this signal on the type 486DX microprocessor and the type 487SX microprocessors. More specifically, for a type 486DX microprocessor, the co-processor error signal, identified has –pERR for clarity, is available at pin C14. For type 487SX microprocessors, the co-processor error signal, identified as –nERR for clarity is available at pin A13. These signals, –pERR and –nERR are routed to the control logic, as will be discussed in more detail below, to develop a signal –pFERR, which is written to a CPU identification (ID) port 44 for type 486DX and 487SX microprocessors.

As mentioned above, the signal re-routing circuit 34 routes the above-mentioned signals in Table I to the correct pin on the expansion socket 26 depending on the particular type of microprocessor inserted therein. The re-routing is accomplished by additional functions from the basic input/output system (BIOS) 31. More specifically, as mentioned above, the sensing circuit 30 detects whether the motherboard is populated with a type 486XX microprocessor by monitoring the parity check signals –PCHKDX and –PCHKSX. These parity check signals, –PCHKDX and –PCHKSX, are only available on Intel-type 486XX microprocessors and are driven high at power up. Thus, if both of these signals, –PCHKDX and –PCHKSX are low at power up, the sensing circuit 30 drives a latch signal –386IN active low and upgrade is not populated. This latch signal, –386IN, is written to the CPU ID port 44 to indicate to the BIOS that a type 386SX microprocessor is wired down on the motherboard and in control. On the other hand, if the parity check signal –PCHKDX, available at the upgrade socket 26, is high at power up, the sensing circuit 30 writes an upgrade signal, –UPGRD, to the CPU ID port 44 to indicate the presence of a type 486XX microprocessor in the expansion socket 26.

Figure 2A:
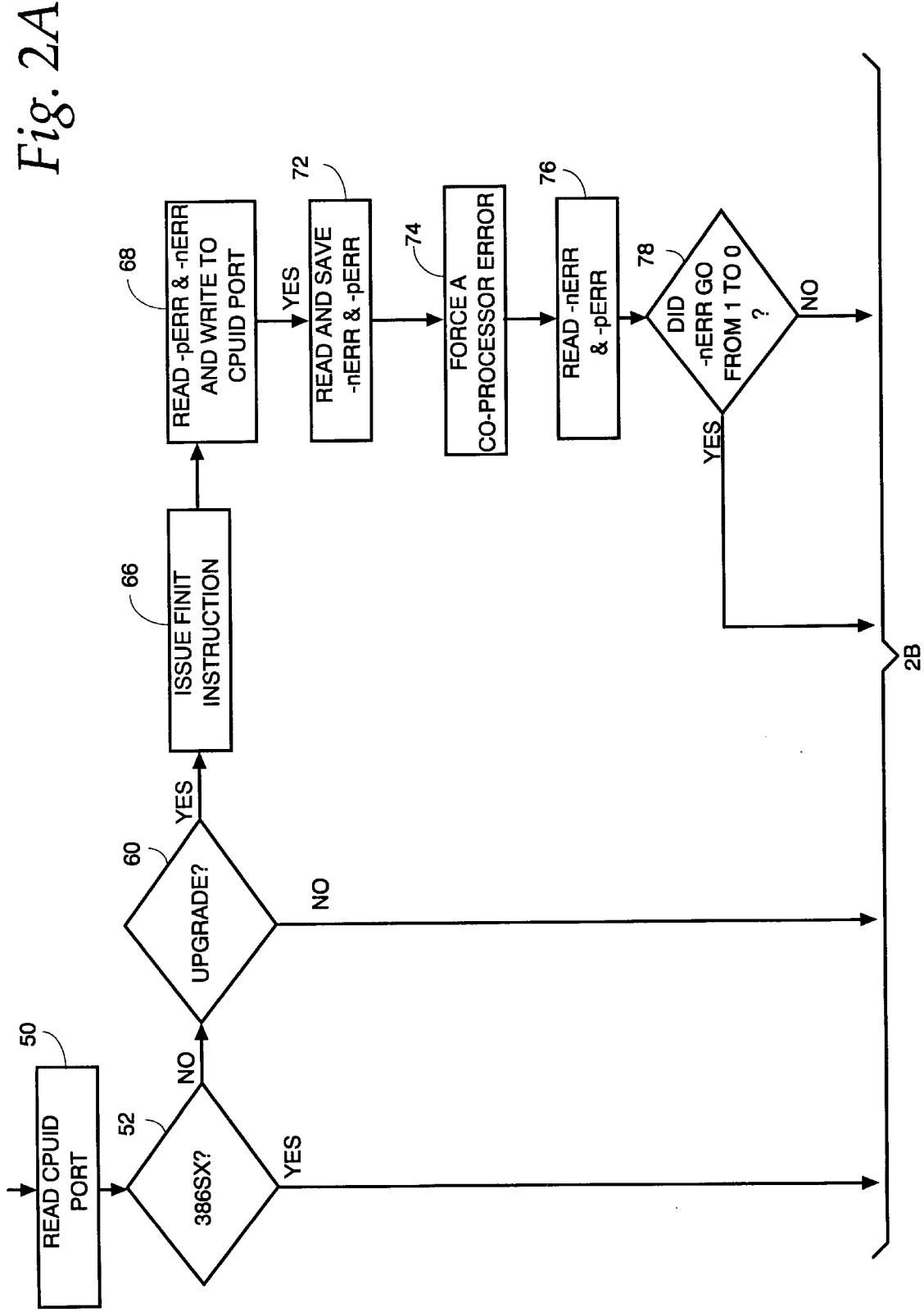
FIGS. 2A and 2B are flow diagrams of the BIOS logic which forms a portion of the present invention.
Figure 2B:
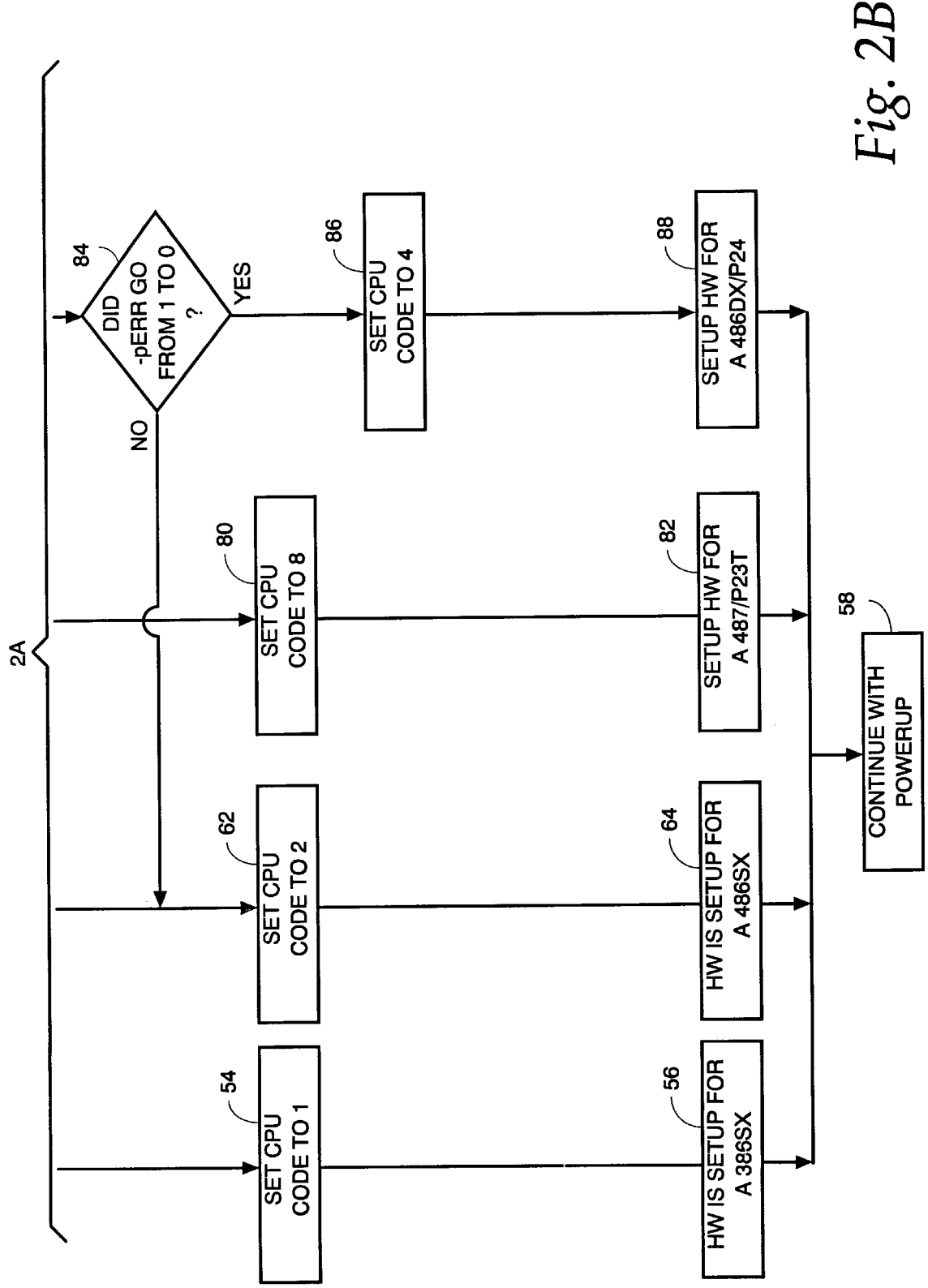

With reference to the flow chart in FIGS. 2A and 2B, the BIOS reads the CPU ID port 44 in step 50 in order to determine in step 52 whether an Intel-type 386SX microprocessor is wired into the motherboard 20 and in control. As mentioned above, a type 386SX microprocessor is indicated if the signal –386IN is active low. If the CPU ID port 44 indicates that a type 386SX microprocessor is wired in and in control, the BIOS sets a bit in memory in step 54. If a type 386SX microprocessor is in control, no signal re-routing is required. Accordingly, in this situation, the system assumes that the hardware is set up in step 56 for a type 386SX microprocessor and continues with its normal power-up sequence in step 58. During such a condition, the upgrade signal –UPGRD will be inactive (e.g., high).

On the other hand, if the signal –386IN is high, this indicates that either a type 486XX microprocessor is installed in the CPU expansion socket 26 or that the wired-in CPU 22 (assumed to be a type 486SX microprocessor) is in control. In order to distinguish between these two situations, the system checks the status of the –UPGRD signal in step 60. The –UPGRD signal is driven by the parity check signal –PCHKDX, available at the CPU expansion socket 26. If the CPU expansion socket 26 is populated with a type 486XX microprocessor, the parity check signal –PCHKDX will be active high, which, in turn, will drive the –UPGRD signal active low.

If the –UPGRD signal is high, this indicates that the CPU expansion socket 26 is unpopulated. During such a condition, the BIOS sets a bit in memory in step 62 indicating the same and assumes in step 64 that the hardware is set up for the wired-in CPU. Since no signal re-routing is required in this case, the system proceeds with the normal power-up sequence in step 58.

As mentioned above, if the signal –386IN is high and the signal –UPGRD is low, this indicates that a type 486XX microprocessor is inserted in the expansion socket 26 and in control. During such a condition, the system must determine the particular type of 486XX microprocessor installed in the expansion socket 26. The system determines the particular type of 486XX microprocessor by manipulating certain signals as described below. In particular, the system is able to distinguish between a type 486SX, 486DX and 487SX microprocessors by manipulating certain co-processor error signals. More particularly, since type 486SX microprocessors do not include an on-board co-processor, monitoring of the co-processor error signal (–pERR or –nERR) will enable the system to distinguish between type 486SX and type 486DX/487SX microprocessors. The system is also able to take advantage of the different pin number locations of the co-processor error signals on the 486DX and 487SX microprocessors to distinguish between those two microprocessors. In particular, once the system determines the presence of an upgrade, the BIOS issues a co-processor FINIT instruction in step 66. If a co-processor is present, as in the case of type 486DX or 487SX microprocessor, this instruction will cause the co-processor to reset to a known state. The BIOS then reads this state in step 68, for example by reading the co-processors internal status register using the FNSTSW AX instruction. In step 68 the BIOS also tests the contents of this register to determine if it contains a zero, indicating a co-processor is present. In the case that AL register is non-zero indicating no co-processor, the system assumes that a type 486SX microprocessor is present in the expansion socket 26 and proceeds to step 62 where the BIOS writes a bit in memory to this effect. In this situation, the system proceeds to step 64 in order to set up the hardware for the type 486SX microprocessor. The system then proceeds with the normal power-up sequence in step 58.

If the internal AL register contains a zero indicating the presence of a co-processor, the system assumes either a type 487SX or type 487SX microprocessor is present in the expansion socket 26. In this situation, the co-processor error signals –pERR and –nERR are read by the BIOS and the state of each is saved in step 72 to be referenced later in steps 78 and 84. The BIOS then forces a co-processor error in step 74, for example by dividing a number by zero, to drive the CPU's co-processor error output signal –nERR or –pERR. The status of the co-processor error signals –nERR and –pERR are then read in step 76. The system then determines which of the error signals changed states in order to distinguish between a type 487SX and a type 486DX microprocessor. In particular, in step 78, the system determines whether the co-processor error signal –nERR changed state from a 1 (high) to a 0 (low). If so, the system assumes that the expansion socket 26 is populated with a type 487SX microprocessor and writes a bit in memory to this effect in step 80. The system proceeds to step 82 where the hardware is configured for a type 487SX microprocessor in order to re-route the signals discussed above.

If the system determines that the co-processor error signal –nERR did not change state from high to low in step 78, the system proceeds to step 84 to determine if the co-processor error signal –pERR changed state from high to low. If so, the system, proceeds to step 86 and assumes a type 486DX microprocessor and writes a bit in memory indicating a type 486DX microprocessor is present. The system then proceeds to step 88 in order to set up the hardware for the type 486DX microprocessor and re-routes the signals as discussed above.

Alternative to checking an internal register of the microprocessor installed in the CPU expansion socket 26 to determine the presence of a co-processor, the BIOS can write the results of step 66 in memory and subsequently proceed to step 74 to force a co-processor error. The system would then check to see if the error signals, –nERR and –pERR changed state from the reset state. If neither of the error signals –nERR and –pERR changed state, the system would assume no co-processor present indicating that a type 486DX or 487SX are not present in the expansion socket 26 and, as such, no signal rerouting necessary. If one of the error signals changed state, the system determines in steps 76–84 which signal changed state, to determine whether a 486DX or 487SX microprocessor was installed in the expansion socket 26.

Once the BIOS determines the particular type of microprocessor installed in the CPU expansion socket 26, the BIOS in conjunction with the signal re-routing circuit 34 re-routes the three co-processor related signals identified in Table I as discussed above. The signals come from XD<0:7> off the microprocessor data bus. In particular, if the system determines that the expansion socket 26 is populated with a type 486SX microprocessor, no signal re-routing is necessary. In this situation, the BIOS only needs to write this information to a system configuration port 89. The system configuration port 89 has its outputs permanently enabled by tying a –ENABLE (pin 1) to ground through a pull-down resistor. Data is clocked in the system configuration port 89 with a clock signal at pin 11. However, in the event the system determines the CPU expansion socket 26 is populated with either a type 486DX or type 487SX microprocessor, the signal re-routing circuit 34 re-routes the non-maskable interrupt signal NMI and the co-processor signal –IGN. Additionally, the signal re-routing circuit 34 also controls whether the co-processor error signal –pFERR is connected to the CPU ID port 44 as discussed above.

Two re-routing enable signals –ENMIDX and –ENMISX, written to the configuration port 89 by the BIOS, are used to control re-routing of the non-maskable interrupt (NMI) and ignore processor signal –IGN to the processor upgrade socket 26 by way of the signal re-routing circuit 34. In particular, the enable signal –ENMISX indicates that the processor upgrade socket 26 is populated with a type 486SX microprocessor while the enable signal –ENMIDX indicates that a 486DX or 487SX microprocessor is inserted in the processor upgrade socket 26 as will be discussed in more detail below.

DETAILED EMBODIMENT

Referring to FIGS. 5A and 5B, the motherboard may include a 196-pin wired-in microprocessor 22, 386SX or no processor and a 196-pin CPU expansion socket 26. As mentioned above, the wired-in CPU 22 is a type 486SX microprocessor or 386SX. The CPU expansion socket 26 is adapted to receive various types of microprocessors, including types 486SX, 486DX and 487SX. For simplicity, only those pins of the wired-in CPU 22 and the CPU expansion socket 26 that relate to the present invention will be discussed and shown connected.

As mentioned above, the parity check signals –PCHKSX and –PCHKDX from the wired-in microprocessor 22 and the microprocessor expansion socket 26, respectively, are used by the system to determine the presence of a type 486XX microprocessor in the microprocessor expansion socket 26. These signals –PCHKSX and –PCHKDX are connected to input pins 14 and 5, respectively, of a programmable logic device (PLD) 102 (FIG. 3B). The signals –PCHKSX and –PCHKDX are pulled low by pull-down resistors 104 and 106 (FIG. 3E), respectively. Thus, if a type 486XX microprocessor is not installed and in control on the motherboard, these signals will be low because there is no microprocessor to drive them and because of the pull-down resistors 104 and 106.

As mentioned above, since there are various options for microprocessor types in the CPU expansion socket 26, the control logic utilizes the co-processor error signals –nERR and –pERR to distinguish between type 486DX and 487SX microprocessors. In particular, these co-processor error signals –nERR and –pERR are only available on type 486DX and type 487SX microprocessors. These signals –nERR and –pERR are not available on type 486SX microprocessors since such a microprocessor does not have an on-board co-processor. However, the pin location of the co-processor error signal on the 486DX differs from the pin location of the co-processor error signal –ERR on the type 487SX. In particular, the co-processor error signal for a 486DX microprocessor is available at pin C14 (FIG. 5B) while the co-processor error signal for a type 487SX microprocessor is available at pin A13. This distinction in pin location of the co-processor error signals is used by the control logic to distinguish between a type 486DX and a type 487SX microprocessor. As mentioned above, the type 486DX co-processor error signal is identified as –pERR, while the type 487SX co-processor error signal is identified as –nERR. These signals –pERR and –nERR are pulled high by pull-up resistors 110 and 108 (FIG. 3E), respectively, and connected to input pins 6 and 7 of the PLD 102 (FIG. 3B).

In order to prevent spurious operation of the control logic, the system is not enabled until the power supply voltage has stabilized. In particular, the system senses two signals PWRGD and VCCGD (FIG. 3A) to determine if the voltage from the power supply has stabilized. The signal PWR-GOOD (FIGS. 1, 3A and 3B) is available from the power supply 33. This signal PWRGOOD is used to develop the VCCGD signal. In particular, the signal PWRGOOD is applied to an non-inverting input of a voltage comparator 112 (FIG. 3A) by way of a voltage divider network that includes the resistors 114 and 116. The signal PWRGOOD, nominally 5 volts, is compared with a reference voltage developed by a resistor 118 and a Zener diode 120 that are serially connected between the output voltage VCC and system ground. The output of the comparator 112 is used to develop a signal PWRGD which, in turn, is applied to pin 4 of the PLD 102 (FIG. 3B).

Figure 3A:
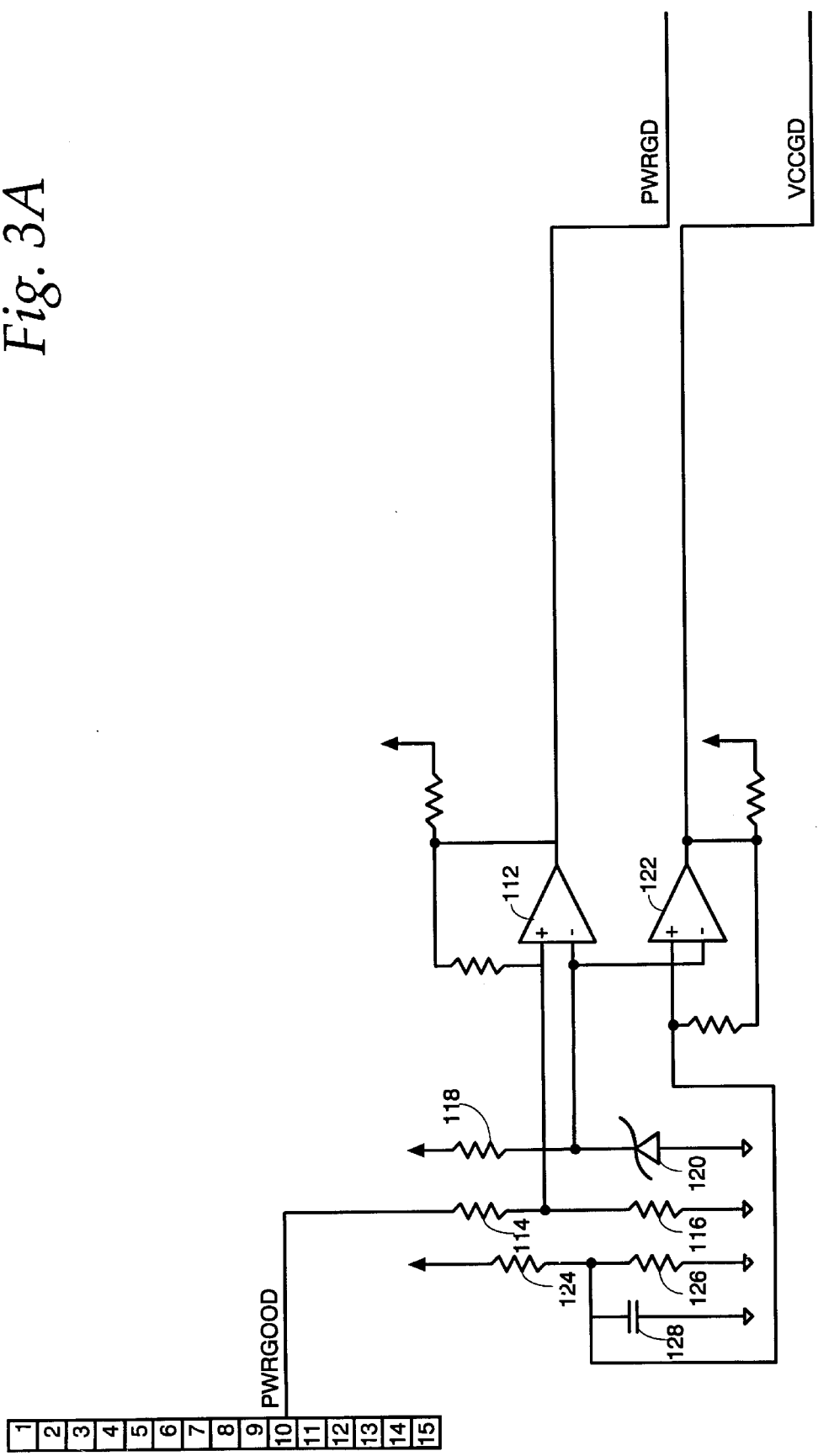
Figure 3B:
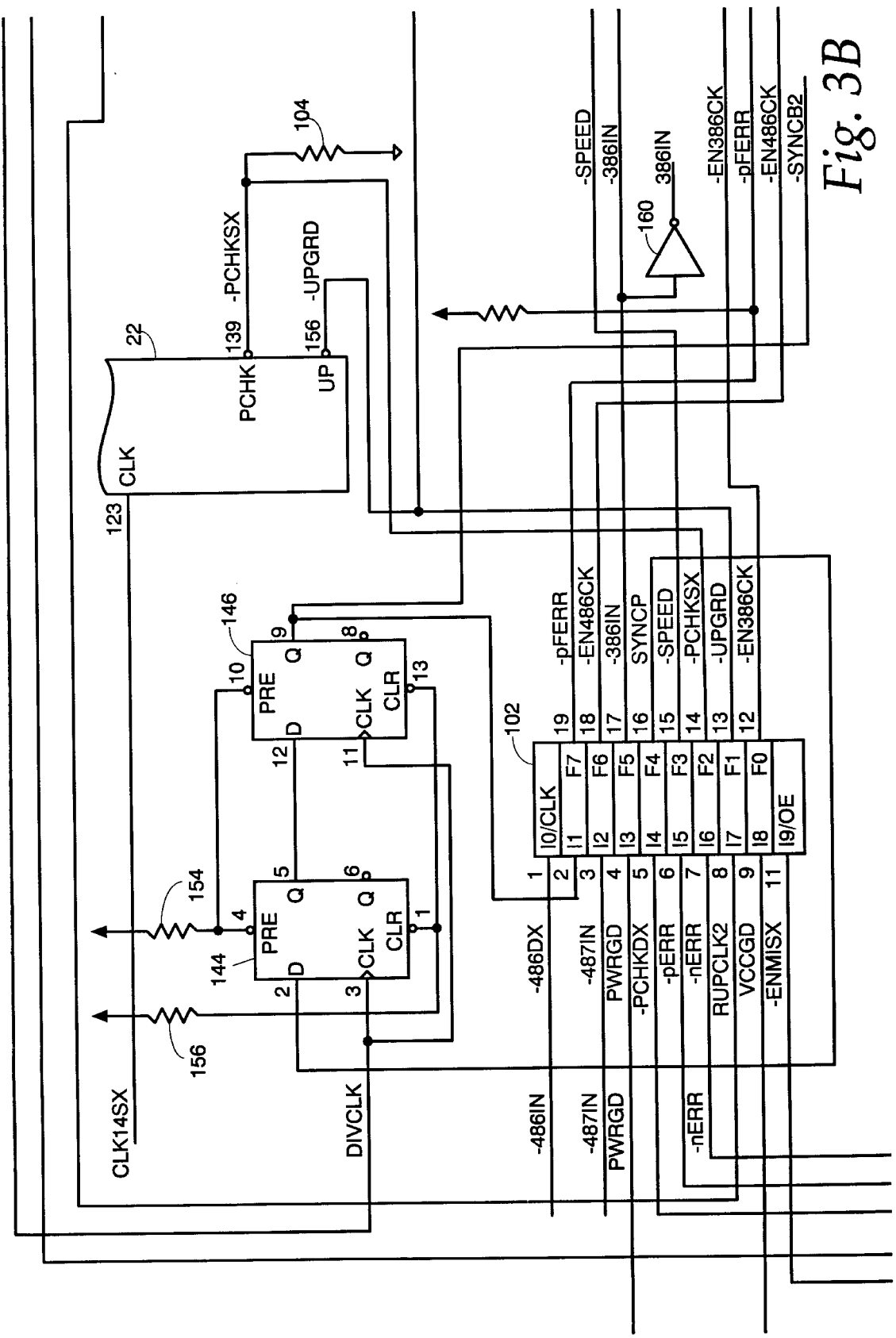

The VCCGD signal is developed by another voltage comparator 122 (FIG. 3A). In particular, another voltage divider network that includes the resistors 124 and 126, connected between VCC and ground, is applied to a non-inverting input of the comparator 122. A capacitor 128 is also connected between the non-inverting input and ground to further control the delay. The reference voltage discussed above is applied to the inverting input of the comparator 122. The output of the comparator 122 is the signal VCCGD. This signal VCCGD is high when the supply voltage VCC is greater than a predetermined value, for example, 4.8 volts. The signal VCCGD is applied to pin 9 of the PLD 102 (FIG. 3B).

The enable signal –ENMISX is also applied to an input (pin 11) of the PLD 102. As mentioned above, this signal is available at the configuration port 90 and is written by the BIOS to indicate the presence of a type 486SX microprocessor in the CPU expansion socket 26.

There are four other input signals to the PLD 102: –486DX, –487IN, –SYNCB2 and RUPCLK2. The clock signal RUPCLK2 is available from the oscillator upgrade socket 28 (FIG. 3C). Thus, any time an upgrade oscillator is plugged into the oscillator expansion socket 28, the RUPCLK2 signal will be toggling at the PLD 102. The signal RUPCLK2 is pulled high by pull-up resistor 130 and is thus high when the oscillator expansion socket 28 is unpopulated. The RUPCLK2 signal is used to develop a –SPEED signal, available at an output pin 15 of the PLD 102 (FIG. 3B). The –SPEED signal will be active low when an upgrade oscillator is inserted into the upgrade oscillator socket 28. This signal –SPEED is used by the disable circuit 40 (FIG. 1) to disable the wired-in clock oscillator 24. The disable circuit 40 includes two tristate devices 132 and 134 (FIG. 3C). These tristate devices 132 and 134 are used to control whether the wired-in oscillator 24 or the upgrade oscillator, inserted into the upgrade oscillator expansion socket 28, functions as the main system clock (CLK20PT). In particular, the output of the wired-in oscillator 24 is connected as the main system clock by way of the tristate device 134. This tristate device 134 is under the control of a SPEED signal, available at the output of an invertor 136. The –SPEED signal is applied to the input of the invertor 136. Thus, when the expansion oscillator socket 28 is unpopulated, the SPEED signal will be low, which enables the tristate device 134 which, in turn, connects the output of the wired-in oscillator 24 as the main system clock. When the oscillator expansion socket 28 is populated, the SPEED signal will be high, thus disabling the tristate device 134 which, in turn, disconnects the output of the wired-in oscillator 24 as the main system clock.

The tristate device 132 is connected to the output of the oscillator expansion socket 28. This tristate device 132 is under the control of the –SPEED signal. During a condition when the expansion oscillator socket 28 is unpopulated, the –SPEED signal will be high thus disabling the tristate device 132 which, in turn, disconnects the output of the oscillator expansion socket 28 as the main system clock. When the oscillator expansion socket is populated, the –SPEED signal will be low which, in turn, enables the tristate device 132 and connects the output of the oscillator expansion socket 28 as the main system clock.

Figure 3D:
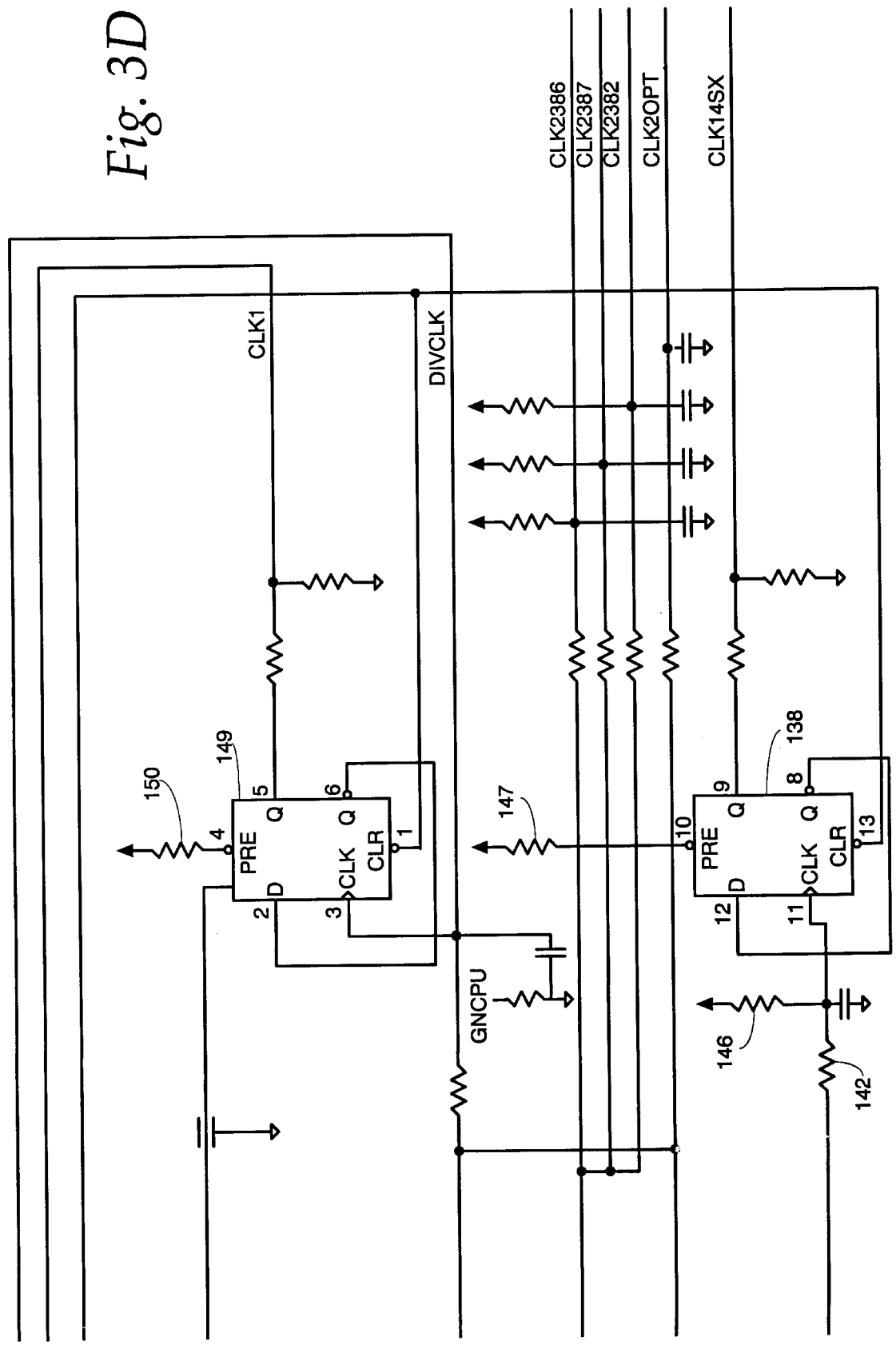

In addition, two signals –EN386CK and –EN486CK available at output pins 12 and 18 of the PLD 102, respectively, also part of the disable circuit 40, control the particular clock input applied to the wired-in CPU 22 and the CPU expansion socket 26. In particular, a clock signal CLK14SX (FIG. 3B) is applied to the clock input of the wired-in CPU 22. This signal CLK14SX is available at the output of a flip-flop 138 (FIG. 3D). The output of the wired-in oscillator 24 is applied to a clock input CLK of the flip-flop 138 by way of a tristate device 140 (FIG. 3C) and a current limiting resistor 142 (FIG. 3D). The tristate device 140 is under the control of the –EN486CK signal. This signal –EN486CK is active low when the power supply 34 is stabilized. Thus, in such a situation, the tristate device 134 is enabled which, in turn, connects the output of the wired-in oscillator 24 to the clock input of the flip-flop 138. The clock signal CLK14SX, available at the Q output of the flip-flop 138 (FIG. 3D), is developed by tying the D input to the $\overline{Q}$ output and tying the preset PRE input high by way of a pull-up resistor 144. The clear input CLR is under the control of a signal –SYNCB2, available from a synchronizer, formed from a pair of flip-flops 144 and 146 (FIG. 3B).

The configuration of the flip-flop 138 (FIG. 3D) provides a clock signal, suitable for a type 486SX microprocessor. During conditions when the wired-in CPU 22 is disabled, the clock input CLK of the flip-flop 138 is pulled high by way of a pull-up resistor 147. During such a condition, the tristate device 140, used to connect the flip-flop 138 to the output of the wired-in oscillator 24, is in a high impedance state, effectively disconnecting the wired-in oscillator 24 from the clock input CLK of the flip-flop 138.

Another signal –EN386CK is used to generate various clock signals used for purposes, including the 386SX cache control logic and wired-in 386SX. In particular, the signal –EN386CK is available at an output pin 12 of the PLD 102 (FIG. 3B). This signal –EN386CK is used to control a tristate device 148 (FIG. 3C). The tristate device 148 is used to connect the wired-in oscillator 24 to various clock outputs used for the various other circuits, such as the 386 cache control logic and wired-in 386SX. As will be discussed in more detail below, the –EN386CK signal is active low any time the power supply is stabilized. Thus, during normal conditions, the auxiliary clock outputs are tied to the output of the wired-in oscillator 24.

A clock signal CLK1 is used to drive the CPU expansion socket 26 as well as auxiliary functions, such as the memory controller. This clock output signal CLK1 is available at the output of a flip-flop 149 (FIG. 3D). The flip-flop 149 is driven by the wired-in oscillator 24 whose input is connected to the clock CLK output of the flip-flop 149 by way of the tristate device 134 (FIG. 3C). The $\overline{Q}$ output is tied to the D input. The preset input is PRE pulled high by way of the pull-up resistor 150. The –SYNCB2 signal is applied to the clear input CLR of the flip-flop 149 (FIG. 3D) and is used to synchronize the output of the flip-flop 149 with the flip-flop 138 in order to synchronize the clock signal applied to the wired-in CPU 22 with the other clock signal applied to the microprocessor installed in the CPU expansion socket 26. Again, this signal –SYNCB2 is available at the output of the synchronizer which includes the flip-flops 144 and 146 (FIG. 3B). These flip-flops 144 and 146 are configured as a divide-by-four counter and driven by a SYNCP signal, available at output pin 16 of the PLD 102. This signal SYNCP is active high any time the power supply is stable. Thus, once the power supply stabilizes, the SYNCP signal remains high and is applied to the D input of the flip-flop 144. The Q output of the flip-flop 144 is applied in turn to the D input of the flip-flop 146. Both the preset inputs of the flip-flops 144 and 146 are pulled high by way of a pull-up resistor 154. The clear inputs CLR of the flip-flops 144 and 146 are likewise pulled high by way of a pull-up resistor 156. The clock inputs CLK of the flip-flops 144 and 146 are driven by a DIVCLK signal. This signal DIVCLK is available at the output of the wired-in oscillator 24. Thus, the flip-flops 144 and 146 function to synchronize the clock of the wired-in oscillator 24 in order to generate the –SYNCB2 signal which, in turn, is used to develop the synchronized clock signal CLK1 for the expansion CPU socket 26 as well as the memory controller (not shown).

Two other signals –486DX and –487IN are also applied to the inputs of the PLD 102 (FIG. 3B). These –486DX and –487IN signals are used to latch the co-processor error signals –pERR and –nERR as will be discussed below. These signals –487IN and –486DX are available from a register (not shown) which is written to by the BIOS. In particular, as mentioned above, once the system determines the particular type of microprocessor populated in the CPU expansion socket 26, the firmware in the BIOS writes the particular microprocessor type to memory, for example, a register. It is this register (not shown) which is used for the signals –487IN and –486DX.

The PLD 102 also provides three output signals –pFERR, –386IN and –UPGRD. The –pFERR signal is a co-processor error signal. As mentioned above, this signal is available on type 486DX and type 487SX microprocessors. As discussed above, –pFERR is driven by the co-processor error signals –nERR and –pERR, available at the output pins of type 486DX and type 487SX microprocessors. These signals –pERR and –nERR are used to drive the –pFERR signal available at pin 19 of the PLD 102 which, in turn, is written to the CPU ID port 44 (FIG. 3F) to indicate a co-processor error to the system.

The –386IN signal is used to indicate the presence of a wired-in type 386SX microprocessor in wire-in CPU 22. This signal –386IN, available at pin 17 of the PLD 102 and its complement 386IN, available at the output of an invertor 160 are used for various purposes by the control logic. In particular, the –386IN signal is written to the CPU ID port 44 to indicate to the system the presence of a type 386SX microprocessor.

Figure 3E:
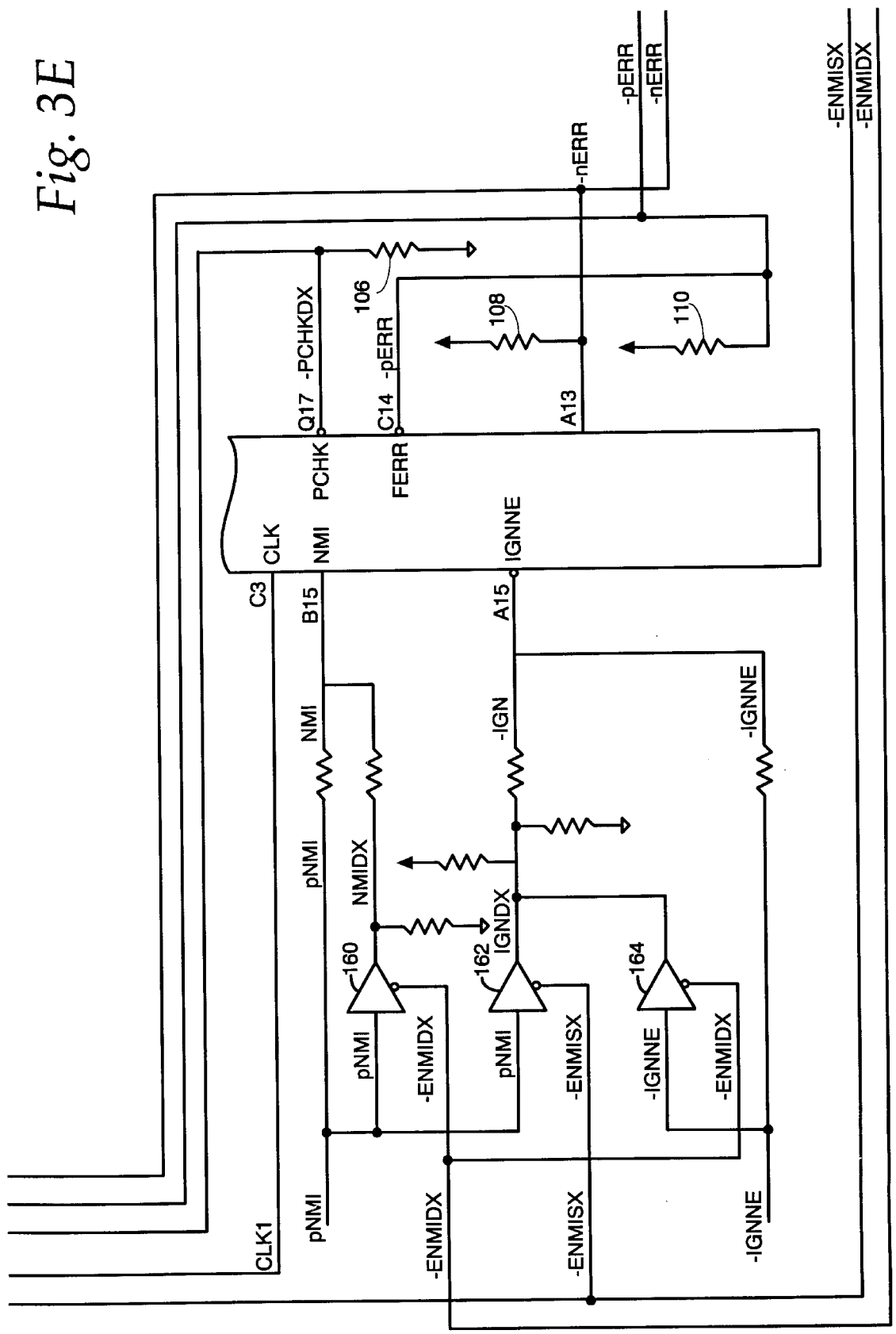
Figure 3F:
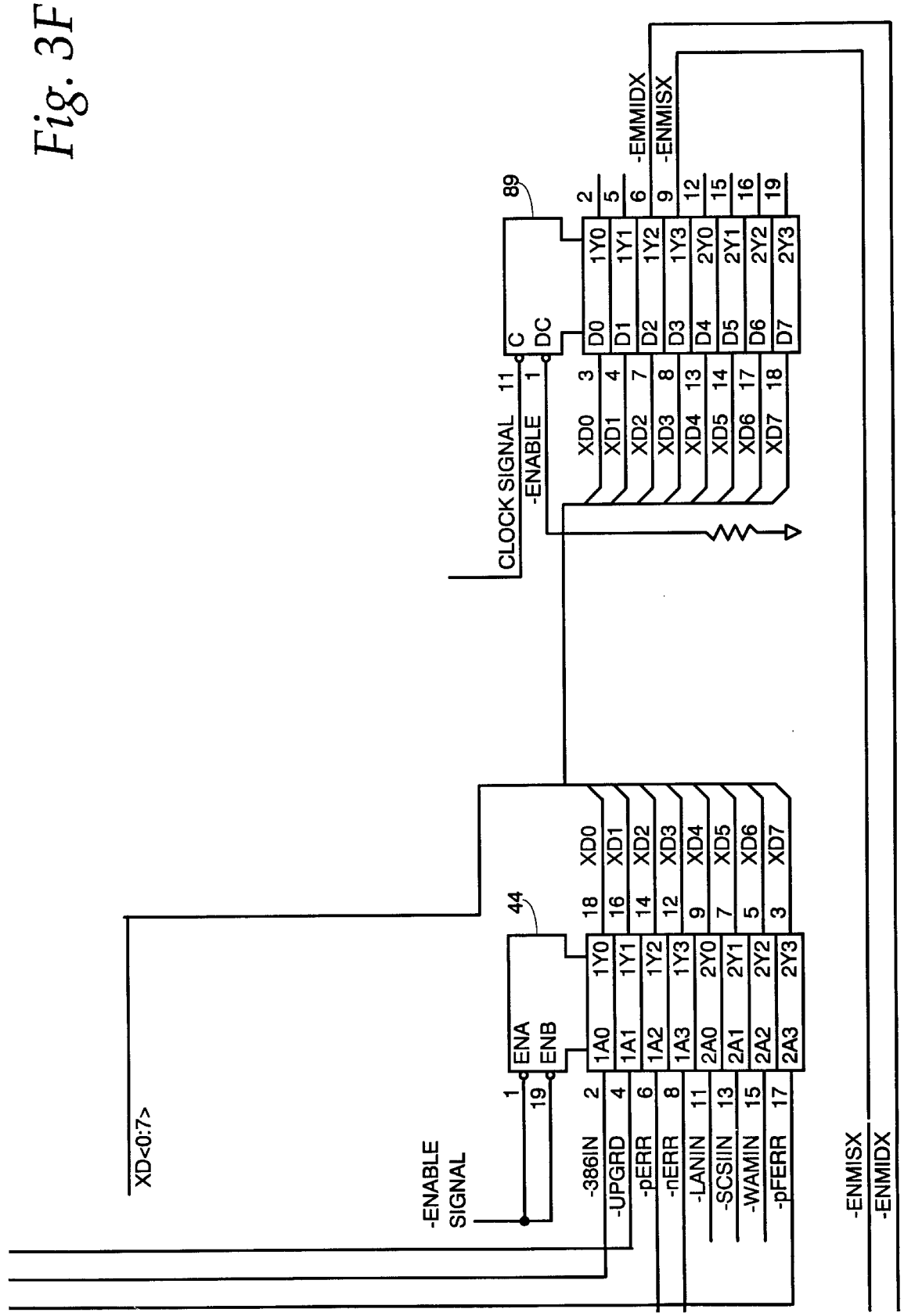
Figure 3G:
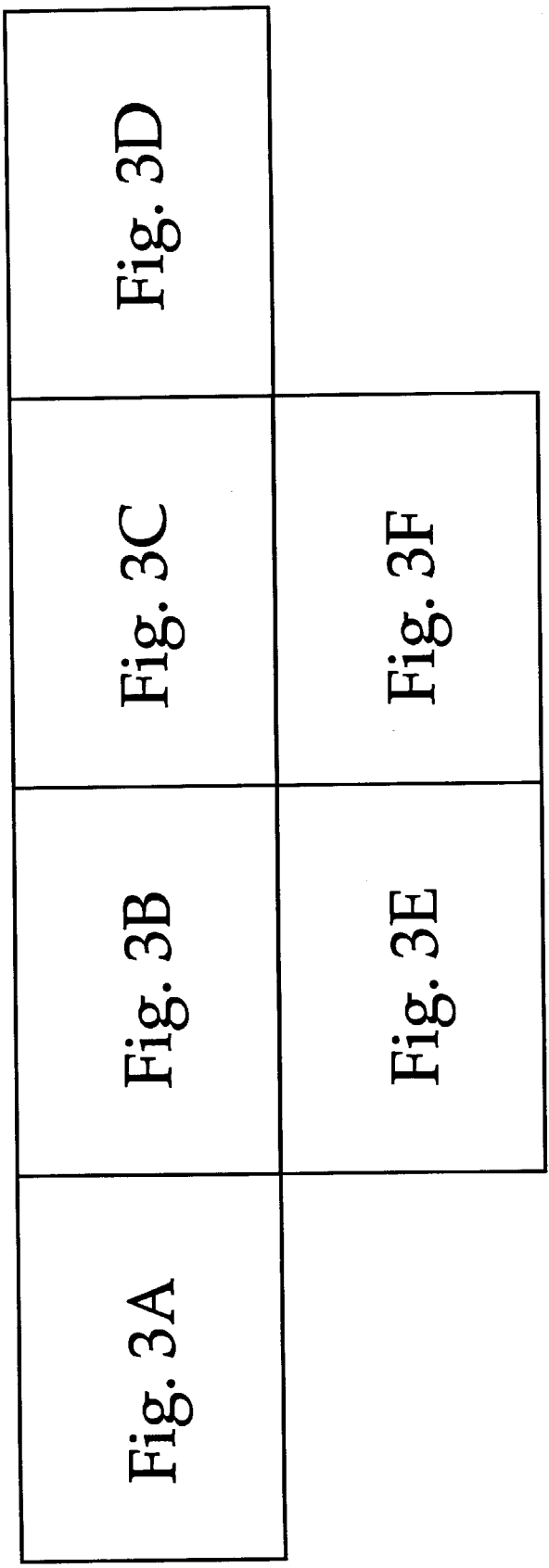
FIG. 3G is an orientation diagram illustrating the orientation of FIGS. 3A–3F.

As discussed above, the upgrade signal –UPGRD, available at pin 13 of the PLD 102, is written to the CPU ID port 44 to indicate the presence of an upgraded CPU in the CPU expansion socket 26. The CPU ID port 44 is enabled with an –ENABLE SIGNAL in a conventional manner. This information is used by the BIOS to determine if a type 486XX microprocessor is in the CPU expansion socket 26 in order to reconfigure certain signals depending on the particular microprocessor installed in the expansion socket 26. In particular, the non-maskable interrupt pNMI and the ignore co-processor error signal –IGNNE are routed to different pins on the CPU expansion socket 26 depending on the particular microprocessor inserted therein. In particular, these signals pNMI and –IGNNE are re-routed by way the signal re-routing circuit 34 which includes of tristate devices 160, 162 and 164. More specifically, the non-maskable interrupt signal PNMI is applied to the inputs of the tristate devices 160 and 162 (FIG. 3E). The output of these tristate devices is connected to pins B15 and A15, respectively. The tristate device 160 is under the control of the enable signal –ENMIDX. The tristate device 162 is under the control of the enable signal –ENMISX. As mentioned above, these enable signals –ENMIDX and –ENMISX are written by the BIOS depending on whether a 486DX microprocessor or a 487SX microprocessor is inserted in the CPU expansion socket 26. The –IGNNE signal is applied to a tristate device 164. This tristate device 164 is under the control of the enable signal –ENMIDX. At power up, all three tristate devices 160, 162 and 164 are in a high impedance state. If the –ENMISX enable signal is active low, indicating that a type 486SX microprocessor is installed in the CPU expansion socket 26, the tristate device 162 is enabled which connects the non-maskable interrupt NMI to pin A15 of the CPU expansion socket 26 which is correct for a type 486SX microprocessor. During this condition, the tristate devices 160 and 164 remain in a high impedance state.

Alternatively, if the enable signal –ENMIDX is active low, indicating that a type 486DX/487SX microprocessor is installed in the CPU expansion socket 26, the tristate devices 160 and 164 are enabled while the tristate device 162 is disabled or in the high impedance state. During this condition, the non-maskable interrupt signal NMI is routed to pin B15 while the –IGNNE signal is routed to pin A15 which is correct for a 486DX/487SX microprocessor.

The upgrade signal –UPGRD is also used to disable the wired-in CPU 22. In particular, the –UPGRD signal is applied to pin UP (156)on of the wired-in CPU 22. This pin UP is an active low signal on a type 486SX which tristates all of the output pins on the type 486SX when active.

PLD CONTROL LOGIC

The control logic for the processor upgrade system may be formed at least in part as an 18-pin programmable logic device (PLD) as illustrated in FIG. 3B. The logic equations for the PLD are provided in Table II. A representative gate level diagram for the PLD 102 is illustrated in FIG. 4.

TABLE II
PLD LOGIC EQUATIONS

```
/Inputs/
Pin   1    =!486dx      ;    /*486 DX NMI, IGNNE mapping       /*
Pin   2    =syncup      ;    /*Double synced vccgd             /*
Pin   3    =!487in      ;    /*487 NMI, IGNEE mapping          /*
Pin   4    =pwrgd       ;    /*Power good indicator            /*
Pin   5    =!pchkdx     ;    /*486dx parity check signal       /*
Pin   6    =!perr       ;    /*486dx co-processor error        /*
Pin   7    =!nerr       ;    /*487sx co-processor error        /*
Pin   8    =rupclk2     ;    /*upgrade clk2                    /*
Pin   9    =vccgd       ;    /*VCC good signal                 /*
Pin   11   =!enmisx     ;    /*Enable NMI for sx               /*
Pin   14   =!pchksx     ;    /*486sx parity check signal       /*
/Outputs/
Pin   19   =!pferr      ;    /*co-processor error              /*
Pin   18   =!en486ck    ;    /*enable 486sx clk1               /*
Pin   17   =486in       ;    /*A 486 is installed, anywhere    /*
Pin   16   =syncb2      ;    /*syncs up divide by 2 flip-flops /*
Pin   15   =!speed      ;    /*enables/disables upgrade/normal
                              osc                              /*
Pin   13   =!upgrd      ;    /*one of 486 upgrades installed   /*
Pin   12   =!en386ck    ;    /*enable 386sx clk2               /*
/Minimization Rules/
Min   !en386ck   =    0;
Min   !pferr     =    0;
Min   486in      =    0;
Min   syncb2     =    0;
Min   !speed     =    0;
Min   !upgrd     =    0;
Min   !en486ck   =    0;
**    Declarations and Intermediate Variable Definitions**/
**    Logic Equations    **/
      en486ck    =    vccgd
                      or en486ck and vccgd and pwrgd;
      en386ck    =    vccgd
                      or en486ck and vccgd and pwrgd;
      486in      =    !pchksx and vccgd
                      or !pchkdx and vccgd
                      or 486in and vccgd and pwrgd;
      upgrd      =    !pchkdx and vccgd
                      or upgrd and vccgd and pwrgd;
      syncb2     =    vccgd and en486ck
                      or syncb2 and vccgd and pwrgd;
      pferr      =    pwrgd and upgrd and 486dx and !enmisx
                      and perr
                      or pwrgd and upgrd and 487in and
                      !enmisx and nerr
                      or pwrgd and upgrd and !enmisx and
                      !486dx and !487in;
      pferr.oe   =    upgrd;
```

Figure 4:
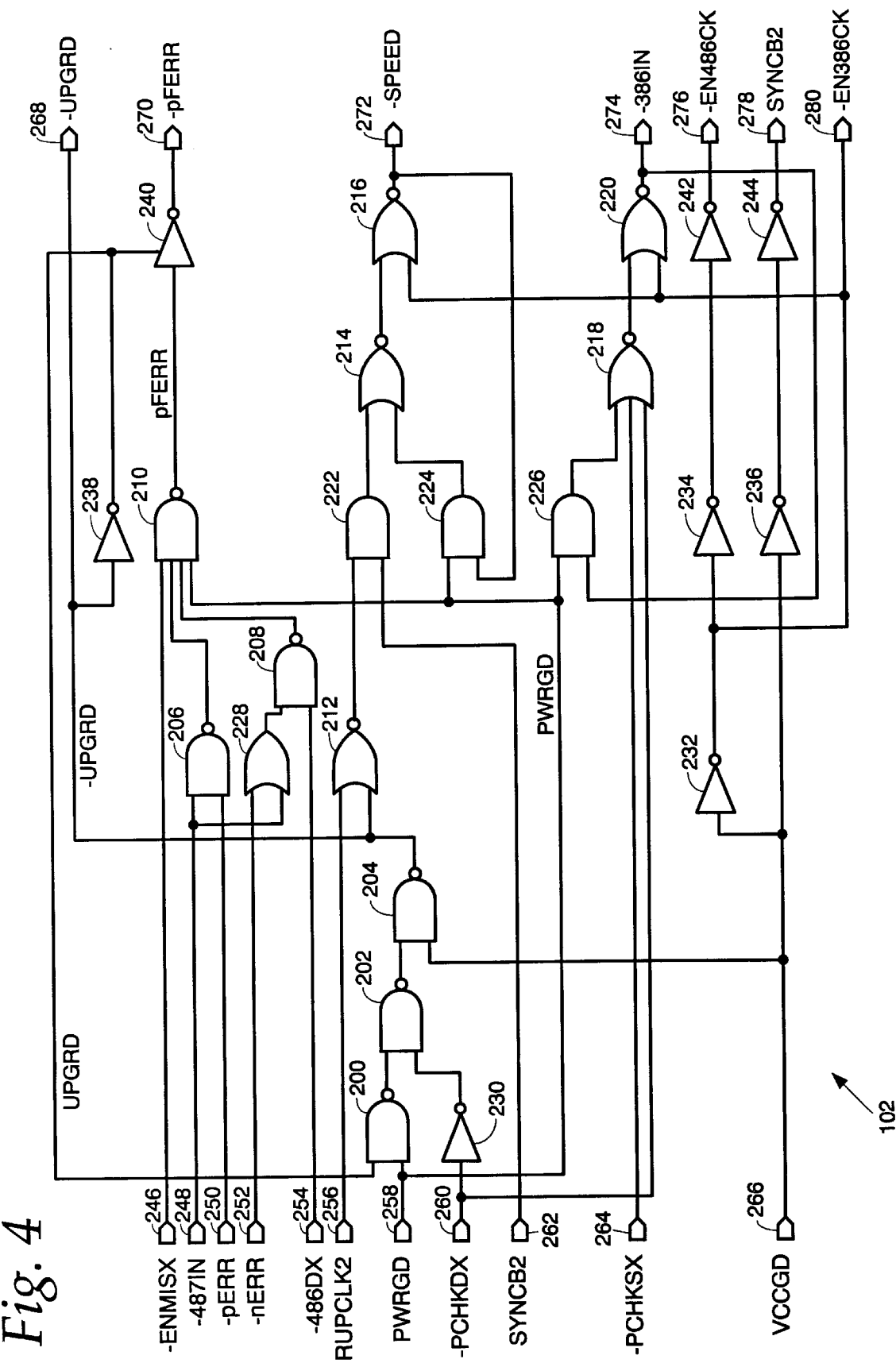
FIG. 4 is a gate level diagram of a portion of the control logic in accordance with the present invention.

Referring to FIG. 4, the PLD includes NAND gates 200, 202, 204, 206, 208 and 210; NOR gates 212, 214, 216, 218 and 220; AND gates 222, 224 and 226; an OR gate 228; and inverters 230, 232, 234, 236, 238, 242 and 244; and a tristate device 240. The PLD includes eleven inputs and seven outputs. The input pins are identified as 246, 248, 250, 252, 254, 256, 258, 260, 262; 264 and 266. The output pins are identified as 268, 270, 272, 274, 276, 278 and 280.

As mentioned above, the sensing circuit 30 monitors the parity check signals −PCHKSX and −PCHKDX from the wired-in microprocessor 22 and the microprocessor expansion socket 26. These signals −PCHKSX and −PCHKDX are connected to pins 264 and 260, respectively, of the PLD 102. In articular, these signals −PCHKSX and −PCHKDX are applied to the NOR gate 218. The power good signal PWRGD is applied to pin 258 of the PLD 102 is also applied to the OR gate 218 by way of an AND gate 226. In order to latch the parity check signals −PCHKSX and −PCHKDX, a signal −386IN, available at the output of the NOR gate 220 is fed back into the AND gate 226. The −386IN signal is available at the output of the NOR gate 220 which, in turn, is driven by the NOR gate 218. In addition, a signal −VCCGD is also applied to an input of the NOR gate 220. Thus, at power up, if there is no type 486 microprocessor in control on the motherboard 20, the parity check signals −PCHKSX and −PCHKDX will be low since there is no microprocessor to drive them and because they are pulled low by the pull-down resistors 104 and 106, respectively. Once the power supply voltage stabilizes, the PWRGD signal will go high. However, the output of the AND gate 226 during such a condition will be low, forcing the output of the NOR gate 218 high. This high output of the NOR gate 218 is applied to one input of the NOR gate 220 along with the VCCGD signal. Since this output signal from the NOR gate 218 will be high at power up, the output of the NOR gate 220 will thus be forced low indicating that a type 386 microprocessor is in control. This signal −386IN is then fed back to the AND gate 226 to form a latch for latching in the signal −386IN low.

If either of the parity check signals −PCHKSX or −PCHKDX goes high at power up indicating that a type 486XX microprocessor is in control on the motherboard, the –386IN signal, available at pin 274, is latched high. In particular, during this condition, the high value of the parity check signal –PCHKSX or –PCHKDX will drive the output of the NOR gate 218 low which, in turn, will drive the output of the NOR gate 220 high which, in turn, is latched in by the feedback back to the AND gate 226.

The upgrade signal –UPGRD available at pin 268 of the PLD 102 is driven by the NAND gate 204. Once the supply voltage stabilizes (e.g, VCCGD goes high) the NAND gate 204 is under the control of the NAND gate 202. Since the –UPGRD signal represents that a type 486XX microprocessor has been inserted into the CPU expansion socket 26, the parity check signal –PCHKDX associated with the CPU expansion socket 26 is used to drive the NAND gate 202 by way of the invertor 230. In order to prevent spurious operation of the control logic, a PWRGD signal is also used to drive the NAND gate 200. This NAND gate 200 is also used in part to latch the –UPGRD signal. In particular, the complement of the –UPGRD signal (e.g., an active high UPGRD signal), available at the output of the invertor 238, is fed back into the NAND gate 200 to form a latch. Thus, any time the upgrade signal –UPGRD goes active low, this will force the NAND gate 200 low (assuming the PWRGD signal is high) which, in turn, drives the NAND gate 202 and, in turn, drives the NAND gate 204 low.

At power up, if the CPU expansion socket 26 is unpopulated, the parity check signal –PCHKDX will be low. This condition will, in turn, drive the output of the NAND gate 202 low which, in turn, will drive the output of the NAND gate 204 high. This high level for the –UPGRD signal will be latched in by way of the feedback loop back to the NAND gate 200.

Should the CPU expansion socket 26 be populated with a type 486XX microprocessor, the parity check signal –PCHKDX will be high at power up which, in turn, will drive the output of the NAND gate 202 high. The high output of the NAND gate 202 will, in turn, drive the output of the NAND gate 204 low. This low output value of the NAND gate 204 is again latched by the feedback loop back to the NAND gate 200.

As mentioned above, the –EN386CK and –EN486CK signals are used to enable various clock signals on the motherboard 20. These signals –EN386CK and –EN486CK are available at pins 280 and 276, respectively, of the PLD 102. The signal –EN386CK is enabled (e.g., active low) once the power supply is stable. In particular, this signal –EN386CK is driven by the VCCGD signal by way of an invertor 232. Thus, once the power supply stabilizes (e.g., VCCGD goes high) the enable signal –EN36CK will be active low.

The enable signal –EN486CK is also enabled once the power supply 33 is stabilized. This signal –EN486CK is thus driven by the VCCGD signal by way of three cascaded inverters 232, 234 and 242. Thus, this signal –EN486CK will be enabled and will remain enabled after the power supply 33 is stabilized.

The co-processor error signal –pFERR, available at pin 270 of the PLD 102 is driven by a tristate device 240 which, in turn, is driven by a NAND gate 210. The tristate device 240 is enabled by the upgrade signal UPGRD. Thus, any time a type 486XX microprocessor is installed in the CPU expansion socket 26, the upgrade signal will be high which, in turn, enables the tristate device 240. During all other conditions, the tristate device 240 will be disabled (e.g., high impedance state). In particular, the tristate device will be disabled when the CPU expansion socket 26 is unpopulated.

As mentioned above, the pin locations of the co-processor error signals differ depending on whether a type 486DX or type 487SX microprocessor has been inserted into the CPU expansion socket 26. Thus, these co-processor error signals –nERR and –pERR are applied to pins 250 and 252 of the PLD 102 which, in turn, are applied as inputs to the OR gate 228 and the NAND gate 206. In addition, the signal –487IN, available at pin 248, is also applied to these gates 206 and 228. As indicated above, the error signal –nERR is active when a type 487SX microprocessor has been inserted into the CPU expansion socket 26. Similarly, the co-processor error signal –pERR is active when a type 486DX microprocessor has been inserted in the CPU expansion socket 26. As further mentioned above, the BIOS writes a FINIT instruction to force the error signal to a known state. Subsequently, the BIOS forces a co-processor error to force a change of state of the co-processor error signal. These signals –nERR and –pERR are monitored to determine if one of them has changed states. Normally, these signals –pERR and –nERR are pulled high by pull-up resistors 108 and 110. Thus, in the situation when the CPU expansion socket 26 is populated with a type 486SX microprocessor or other microprocessors other than types 486DX and 487SX, the co-processor error signals –pERR and –nERR will be high because they are pulled high by the pull-up resistors 108 and 110 respectively, and because there will be no microprocessor capable of driving them. Thus, in this situation, these signals –pERR and –nERR will be high. In addition, the signals –486DX applied to the NAND gate 208 along with the output of the OR gate 228, and the signal –487IN will also be high. As indicated above, these signals –486DX and –487IN are written by the BIOS in response to changes of state of the co-processor error signals –pERR and –nERR. Thus, in the situation where neither a type 486DX nor a type 487SX microprocessor has been installed in the CPU expansion socket 26, these signals –486DX and –487IN will be high. During this condition, these signals –486DX and –487SX will force the outputs of the NAND gates 206 and 208 low which, in turn, will force the output of the NAND gate 210 high. In addition, the enable signal –ENMISX is also applied to the NAND gate 210. As mentioned above, this signal –ENMISX is written to the configuration port 90 by the BIOS depending upon the particular type of microprocessor inserted in the CPU expansion socket. During a condition when the CPU expansion socket is not populated with either a type 486DX or type 487SX microprocessor, this enable signal –ENMISX will be high.

If either a type 486DX or a type 487SX microprocessor has been inserted into the CPU expansion socket 26, one or the other of the co-processor error signals –pERR or –nERR will be active depending upon the particular microprocessor inserted into the socket 26. Similarly, one or the other of the status signals –486DX and –487IN will also be active low. Assuming that a type 486SX microprocessor has been inserted into the CPU expansion socket 26, the –486DX signal and –pERR signal will be active. These signals –486DX and –pERR will drive the NAND gate 208 and NAND gate 206 which, in turn, drives the NAND gate 210 low. On the other hand, if a type 487SX microprocessor has been inserted into the CPU expansion socket 26, the signals –nERR will be active. In addition, the signal –487IN will also be active low driving the output of the NOR gate 228 low. The output of the NOR gate 228 is combined with a –486DX signal which will be high during this situation to drive the output of the NAND gate 208 high. During this condition, the output of the NAND gate 206 is high. Since the PWRGD signal will also be high and the enable signal -ENMISX will be high, this will, in turn, drive the output of the NAND gate 210 low.

The -SPEED signal is available at pin 272 of the PLD 102. This signal is driven by the NOR gate 216. The NOR gate 216, in turn, is under the control of the NOR gate 214 once the power supply stabilizes. In particular, an active low -VCCGD signal, available at the output of an invertor 232 is applied to one input of the NOR gate 216. Thus, once the power supply stabilizes, this input will be held low placing the NOR gate 216 under the control of the control of the NOR gate 214. The NOR gate 214 is driven by two AND gates 222 and 224. The AND gate 224 is used to latch the output of the NOR gate 216 once the power supply voltage stabilizes. In particular, the output of the NOR gate 216 is applied to one input of the AND gate 224. The PWRGD signal is applied to the other inputs. Thus, once the power supply stabilizes, the AND gate 224 will latch the output of the NOR gate 216.

The NOR gate 214 is under the control of an AND gate 222. The AND gate 222, in turn, is under the control of the SYNCB2 signal, available at the Q output of the flip-flop 146 and the NOR gate 212 (see FIGS. 1 and 3B). The NOR gate 212 is driven by the upgrade signal -UPGRD and the RUPCLK2 signals. As mentioned above, the -UPGRD signal is active low any time a type 486XX microprocessor has been inserted into the CPU expansion socket 26. The RUPCLK2 signal is active any time an upgrade oscillator is inserted into the upgrade oscillator socket 26. Thus, the output of the NOR gate 212 is a clock signal which has the same frequency as the upgrade oscillator inserted into the upgrade oscillator socket 28. This signal RUPCLK is used to drive the AND gate 222 along with the SYNCB2 signal and, in turn, the NOR gate 214 in order to generate the -SPEED signal.

Obviously, many modifications and variations of the present invention are possible in light of the above teachings. Thus, it is to be understood that, within the scope of the appended claims, the invention may be practiced otherwise than as specifically described above.

What is claimed and desired to be secured by letters patent of the united states is:

1. An upgradable computer system, comprising:

a motherboard having a first central processing unit (CPU) and a clock oscillator having a predetermined first frequency for providing said CPU with a timing signal;

a CPU expansion socket, said CPU socket electrically connected and mounted on said motherboard, said CPU expansion socket adapted to receive an upgrade CPU on said motherboard to upgrade the computer system, said upgrade CPU selected from a predetermined group of CPUs of different predetermined types, said predetermined types including CPUs from predetermined different families, wherein one of said predetermined types and families includes one or more predetermined signals disposed at different predetermined pin locations relative to another one of said different predetermined types;

means carried by said motherboard for automatically sensing the presence of a CPU in said expansion socket;

means carried by said motherboard for automatically determining the type and family of said upgrade CPU installed in said expansion socket;

means carried by said motherboard for automatically disabling said first CPU in the event that said sensing means detects the presence of said upgrade CPU in said expansion socket, said disabling means including means for preventing said clock oscillator timing signals from driving said first CPU and automatically enabling said upgrade CPU and storing in memory the type and family of said upgrade CPU present in the computer system;

means carried by said motherboard for automatically rerouting said predetermined signals to predetermined pin locations on said CPU expansion socket depending on the type of upgrade CPU installed in said expansion socket; and means carried by said motherboard for initializing hardware in the computer system for specifically functioning in accordance with the type and family of said second CPU installed in the computer system.

2. An upgradable computer system as recited in claim 1, wherein said first CPU is wired down to said motherboard.

3. An upgradable computer system as recited in claim 1, wherein the characteristics of said first CPU and one predetermined type of said upgrade CPUs are the same.

4. An upgradable computer system as recited in claim 1, wherein the characteristics of said first CPU and one or more predetermined types of said upgrade CPUs are different.

5. An upgradable computer system as recited in claim 1, wherein said first CPU is an Intel-type 486SX.

6. An upgradable computer system as recited in claim 1, wherein one of said predetermined types of upgrade CPUs is an Intel-type 386SX.

7. An upgradable computer system as recited in claim 1, wherein one of said predetermined types of upgrade CPUs is an Intel-type 486SX.

8. An upgradable computer system as recited in claim 1, wherein one of said predetermined types of upgrade CPUs is an Intel-type 486DX.

9. An upgradable computer system as recited in claim 1, wherein one of said predetermined types of upgrade CPUs is an Intel-type 487SX.

10. An upgradable computer system as recited in claim 1, wherein said predetermined types of upgrade CPUs are selected from the group consisting of: Intel-type 386SX, Intel-type 486SX, Intel-type 486DX and Intel-type 487SX microprocessors.

11. An upgradable computer system as recited in claim 1, wherein said sensing means includes means for sensing predetermined characteristics of predetermined types of CPUs.

12. An upgradable computer system as recited in claim 11, wherein said predetermined types of CPUs are selected from the group consisting of: an Intel-type 486SX; an Intel-type 486DX; and an Intel-type 487SX.

13. An upgradable computer system as recited in claim 12, wherein said predetermined characteristic is a parity check signal.

14. An upgradable computer system as recited in claim 1, wherein said sensing means includes means for automatically distinguishing between a first predetermined class of upgrade CPUs and a second predetermined class of upgrade CPUs.

15. An upgradable computer system as recited in claim 14, wherein said first predetermined class of CPU's includes an Intel-type 386SX.

16. An upgradable computer system as recited in claim 14, wherein said second predetermined class of upgrade CPUs includes Intel-type 486SX, 486DX and 487SX CPUs.

17. An upgradable computer system as recited in claim 16, further including means for distinguishing between a first predetermined subclass and a second predetermined subclass in said second predetermined class.

18. An upgradable computer system as recited in claim 17, wherein said first predetermined subclass includes an Intel-type 486SX CPU.

19. An upgradable computer system as recited in claim 18, wherein said second predetermined subclass includes Intel-type 486DX and Intel-type 487SX CPUs.

20. An upgradable computer system as recited in claim 11, wherein said predetermined characteristics include a parity check signal.

21. An upgradable computer system as recited in claim 20, wherein said predetermined characteristics also include a co-processor error signal.

22. An upgradable computer system as recited in claim 1, wherein said motherboard further includes an expansion socket for an upgrade oscillator.

23. An upgradable computer system as recited in claim 22, wherein said sensing means further includes means for sensing the presence of an upgrade oscillator in said oscillator expansion socket.

24. An upgradable computer system as recited in claim 23, further including means for automatically disabling said first predetermined clock oscillator when said sensing means detects the presence of an upgrade oscillator in said oscillator expansion socket.

25. An upgradable computer system, comprising:
a motherboard having a first central processing unit (CPU), an oscillator for providing clock pulses to said central processing unit and a predetermined expansion socket electrically connected and mounted on said motherboard for receiving a second CPU, said second CPU selected from a predetermined group of CPUs of different predetermined types, said predetermined types including CPU from predetermined different families, wherein one of said predetermined types and families includes one or more predetermined signals disposed at different predetermined pin locations relative to another one of said different predetermined types;

means carried by said motherboard for automatically sensing the presence of an upgrade CPU in said expansion socket;

means carried by said motherboard for automatically determining the type of said first CPU under predetermined conditions and for automatically determining the type and family of said second CPU installed in said expansion socket;

means carried by said motherboard for enabling said second CPU installed in said expansion socket and disabling said first CPU when said second CPU is sensed in said expansion socket, said disabling means including means for preventing said oscillator clock pulses from driving said first CPU;

means carried by said motherboard for automatically rerouting said predetermined signals to predetermined pin locations on said CPU expansion socket depending on the type of upgrade CPU installed in said expansion socket: and means carried by said motherboard for initializing hardware in the computer system for specifically functioning in accordance with the type and family of said second CPU installed in the computer system.

26. An upgradable computer system, comprising:
a motherboard having a first CPU, a clock oscillator for providing timing signals to said CPU and an electrically connected and mounted predetermined expansion socket adapted to receive a second CPU to upgrade the computer systems said second CPU selected from a predetermined group of CPUs of different predetermined types, said predetermined types including CPUs from predetermined different families, wherein one of said predetermined types and families includes one or more, predetermined signals disposed at different predetermined pin locations relative to another one of said different predetermined types;

means carried by said motherboard for automatically sensing the presence of a CPU in said expansion docket;

means carried by said motherboard for automatically determining the type of said first CPU and for determining the type and family of any CPU installed in said expansion socket for upgrading the computer system;

means carried by said motherboard for automatically disabling said first CPU when a second CPU is installed in said expansion socket and enabling said second CPU, said disabling means including means for preventing timing signals from said oscillator from driving said first CPU;

means carried by said motherboard for automatically rerouting said predetermined signals to predetermined pin locations on said CPU expansion socket depending on the type of upgrade CPU installed in said expansion socket; and means carried by said motherboard for initializing hardware in the computer system for specifically functioning in accordance with the type and family of said second CPU installed in the a computer system.

27. An upgradable computer system as recited in claim 26, wherein said motherboard further includes another expansion socket for a clock oscillator.

28. An upgradable computer system as recited in claim 27, wherein said disabling means further includes means for disabling said first clock oscillator when an upgrade oscillator is installed in said oscillator expansion socket.

29. An upgradable computer system as recited in claim 26, wherein said CPU expansion socket is adapted to receive a plurality of types of upgrade CPUs.

30. An upgradable computer system as recited in claim 25, further including means for re-routing predetermined signals to said CPU expansion socket depending upon the type of CPU installed in said CPU expansion socket.

* * * * *

UNITED STATES PATENT AND TRADEMARK OFFICE
CERTIFICATE OF CORRECTION

PATENT NO. : 5,848,250
DATED : December 8, 1998
INVENTOR(S) : Smith, et al.

It is certified that error appears in the above-identified patent and that said Letters Patent is hereby corrected as shown below:

Column 20, line 10; delete "systems" and insert --system,-- therefor.

Column 20, line 15; delete "more," and insert --more-- therefor.

Column 20, line 20; delete "docket" and insert --socket-- therefor.

Column 20, line 42; delete "a" therefor.

Signed and Sealed this

Sixteenth Day of November, 1999

Attest:

Attesting Officer

Q. TODD DICKINSON

Acting Commissioner of Patents and Trademarks